(12) United States Patent
Gulati et al.

(10) Patent No.: US 12,375,998 B2
(45) Date of Patent: Jul. 29, 2025

(54) MOBILE STATION RELAYING VERIFICATION

(71) Applicant: QUALCOMM Incorporated, San Diego, CA (US)

(72) Inventors: Kapil Gulati, Belle Mead, NJ (US); Hong Cheng, Basking Ridge, NJ (US); Anantharaman Balasubramanian, San Diego, CA (US); Navid Abedini, Basking Ridge, NJ (US); Aria Hasanzadezonuzy, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/823,917

(22) Filed: Aug. 31, 2022

(65) Prior Publication Data
US 2024/0073777 A1    Feb. 29, 2024

(51) Int. Cl.
*H04W 40/00* (2009.01)
*H04L 1/1607* (2023.01)
*H04W 40/22* (2009.01)

(52) U.S. Cl.
CPC .......... *H04W 40/22* (2013.01); *H04L 1/1607* (2013.01)

(58) Field of Classification Search
CPC ............... H04W 40/22; H04L 1/607
See application file for complete search history.

(56) References Cited

U.S. PATENT DOCUMENTS

| 2015/0009890 A1* | 1/2015 | Seo ........................ H04B 7/15 370/315 |
| 2016/0204951 A1 | 7/2016 | Walton et al. |
| 2017/0295178 A1 | 10/2017 | Cheng et al. |
| 2018/0292522 A1 | 10/2018 | Cavendish et al. |

FOREIGN PATENT DOCUMENTS

| WO | WO-2016048446 A1 | 3/2016 |
| WO | WO-2018067956 A1 | 4/2018 |
| WO | WO-2022038292 A1 | 2/2022 |

OTHER PUBLICATIONS

International Search Report and Written Opinion—PCT/US2023/071353—ISA/EPO—Nov. 2, 2023.

* cited by examiner

*Primary Examiner* — Erika A Washington
(74) *Attorney, Agent, or Firm* — Harrity & Harrity, LLP

(57) ABSTRACT

Various aspects of the present disclosure generally relate to wireless communication. In some aspects, a mobile station may receive, from a first network entity, data to be relayed to a second network entity. The mobile station may transmit the data to the second network entity. The mobile station may receive, from the second network entity, a digitally signed acknowledgement of reception of the data. The mobile station may transmit the digitally signed acknowledgement to the first network entity. Numerous other aspects are described.

30 Claims, 14 Drawing Sheets

MOBILE STATION RELAYING VERIFICATION

FIELD OF THE DISCLOSURE

Aspects of the present disclosure generally relate to wireless communication and to techniques and apparatuses for mobile station relaying verification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a mobile station for wireless communication. The mobile station may include a memory and one or more processors coupled to the memory. The one or more processors may be configured to, based at least in part on information stored in the memory, receive, from a first network entity, data to be relayed to a second network entity. The one or more processors may be configured to, based at least in part on information stored in the memory, transmit the data to the second network entity. The one or more processors may be configured to, based at least in part on information stored in the memory, receive, from the second network entity, a digitally signed acknowledgement of reception of the data. The one or more processors may be configured to, based at least in part on information stored in the memory, transmit the digitally signed acknowledgement to the first network entity.

Some aspects described herein relate to a mobile station for wireless communication. The mobile station may include a memory and one or more processors coupled to the memory. The one or more processors may be configured to, based at least in part on information stored in the memory, receive, from a relay mobile station, data originating from a network entity and relayed by the relay mobile station. The one or more processors may be configured to, based at least in part on information stored in the memory, transmit, to the relay mobile station, a digitally signed acknowledgement of reception of the data.

Some aspects described herein relate to a network entity for wireless communication. The network entity may include a memory and one or more processors coupled to the memory. The one or more processors may be configured to, based at least in part on information stored in the memory, transmit, to a relay mobile station, data to be relayed to a remote mobile station. The one or more processors may be configured to, based at least in part on information stored in the memory, receive, from the relay mobile station, a digitally signed acknowledgement of reception of the data by the remote mobile station.

Some aspects described herein relate to a method of wireless communication performed by a mobile station. The method may include receiving, by the mobile station and from a first network entity, data to be relayed to a second network entity. The method may include transmitting, by the mobile station, the data to the second network entity. The method may include receiving, by the mobile station and from the second network entity, a digitally signed acknowledgement of reception of the data. The method may include transmitting, by the mobile station, the digitally signed acknowledgement to the first network entity.

Some aspects described herein relate to a method of wireless communication performed by a mobile station. The method may include receiving, by the mobile station and from a relay mobile station, data originating from a network entity and relayed by the relay mobile station. The method may include transmitting, by the mobile station and to the relay mobile station, a digitally signed acknowledgement of reception of the data.

Some aspects described herein relate to a method of wireless communication performed by a network entity. The method may include transmitting, by the network entity and to a relay mobile station, data to be relayed to a remote mobile station. The method may include receiving, by the network entity and from the relay mobile station, a digitally signed acknowledgement of reception of the data by the remote mobile station.

Some aspects described herein relate to a non-transitory computer-readable medium that stores a set of instructions for wireless communication by a mobile station. The set of instructions, when executed by one or more processors of the mobile station, may cause the mobile station to receive, from a first network entity, data to be relayed to a second network entity. The set of instructions, when executed by one or more processors of the mobile station, may cause the mobile station to transmit the data to the second network entity. The set of instructions, when executed by one or more processors of the mobile station, may cause the mobile station to receive, from the second network entity, a digitally signed acknowledgement of reception of the data. The set of instructions, when executed by one or more processors of the mobile station, may cause the mobile station to transmit the digitally signed acknowledgement to the first network entity.

Some aspects described herein relate to a non-transitory computer-readable medium that stores a set of instructions for wireless communication by a mobile station. The set of instructions, when executed by one or more processors of the mobile station, may cause the mobile station to receive, from a relay mobile station, data originating from a network entity and relayed by the relay mobile station. The set of instructions, when executed by one or more processors of the mobile station, may cause the mobile station to transmit, to the relay mobile station, a digitally signed acknowledgement of reception of the data.

Some aspects described herein relate to a non-transitory computer-readable medium that stores a set of instructions for wireless communication by a network entity. The set of instructions, when executed by one or more processors of the network entity, may cause the network entity to transmit, to a relay mobile station, data to be relayed to a remote mobile station. The set of instructions, when executed by one or more processors of the network entity, may cause the network entity to receive, from the relay mobile station, a digitally signed acknowledgement of reception of the data by the remote mobile station.

Some aspects described herein relate to an apparatus for wireless communication. The apparatus may include means for receiving, from a first network entity, data to be relayed to a second network entity. The apparatus may include means for transmitting the data to the second network entity. The apparatus may include means for receiving, from the second network entity, a digitally signed acknowledgement of reception of the data. The apparatus may include means for transmitting the digitally signed acknowledgement to the first network entity.

Some aspects described herein relate to an apparatus for wireless communication. The apparatus may include means for receiving, from a relay mobile station, data originating from a network entity and relayed by the relay mobile station. The apparatus may include means for transmitting, to the relay mobile station, a digitally signed acknowledgement of reception of the data.

Some aspects described herein relate to an apparatus for wireless communication. The apparatus may include means for transmitting, to a relay mobile station, data to be relayed to a remote mobile station. The apparatus may include means for receiving, from the relay mobile station, a digitally signed acknowledgement of reception of the data by the remote mobile station.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
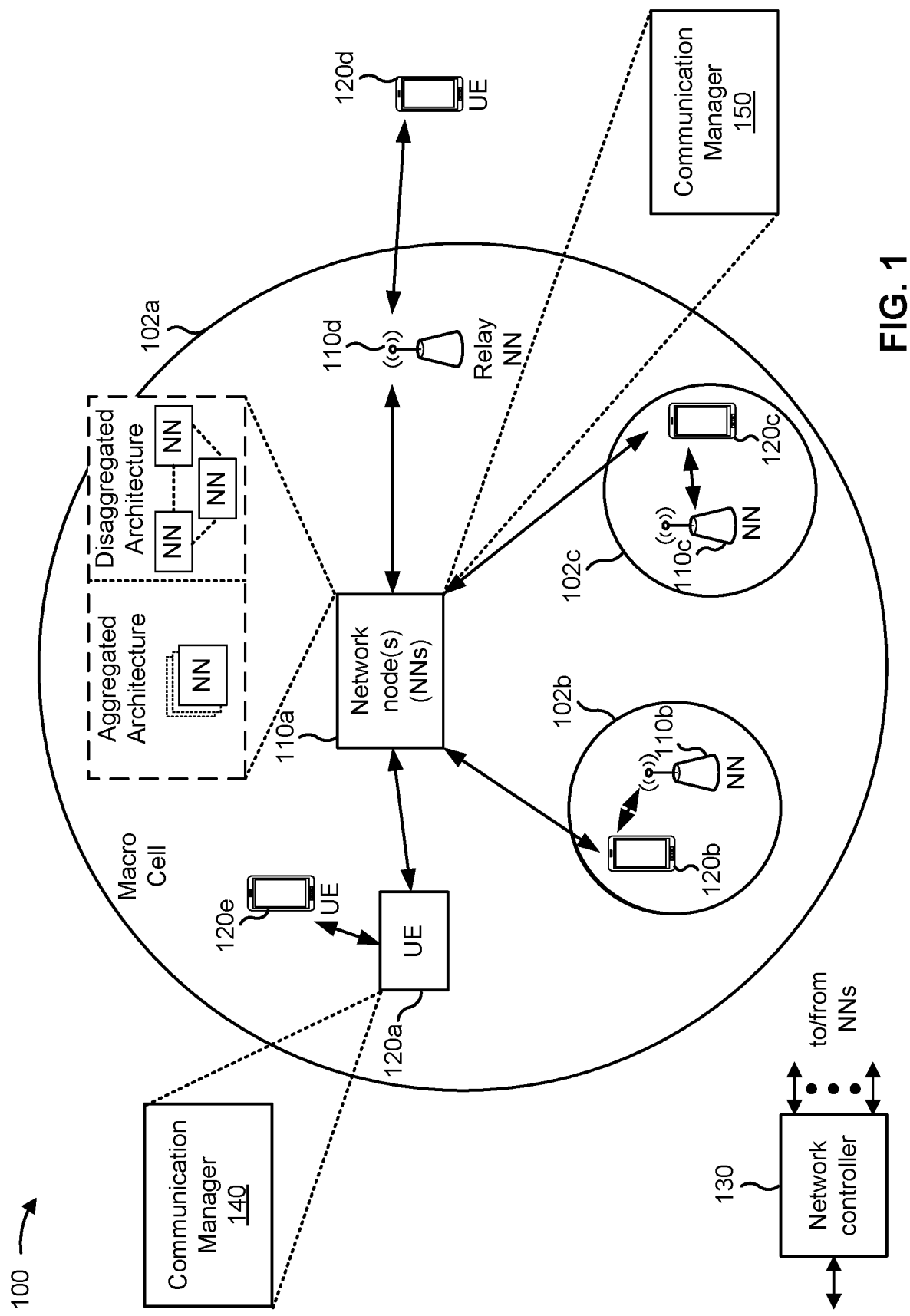
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station (e.g., the UE 120) may include a communication manager 140. As described in more detail elsewhere herein, the communication manager 140 may receive, from a first network entity, data to be relayed to a second network entity; transmit the data to the second network entity; receive, from the second network entity, a digitally signed acknowledgement of reception of the data; and transmit the digitally signed acknowledgement to the first network entity. Additionally, or alternatively, the communication manager 140 may perform one or more other operations described herein.

In some aspects, as described in more detail elsewhere herein, the communication manager 140 may receive, from a relay mobile station, data originating from a network entity and relayed by the relay mobile station; and transmit, to the relay mobile station, a digitally signed acknowledgement of reception of the data. Additionally, or alternatively, the communication manager 140 may perform one or more other operations described herein.

In some aspects, a network entity (e.g., the network node 110) may include a communication manager 150. As described in more detail elsewhere herein, the communication manager 150 may transmit, to a relay mobile station, data to be relayed to a remote mobile station; and receive, from the relay mobile station, a digitally signed acknowledgement of reception of the data by the remote mobile station. Additionally, or alternatively, the communication manager 150 may perform one or more other operations described herein.

As indicated above, FIG. 1 is provided as an example. Other examples may differ from what is described with regard to FIG. 1.

Figure 2:
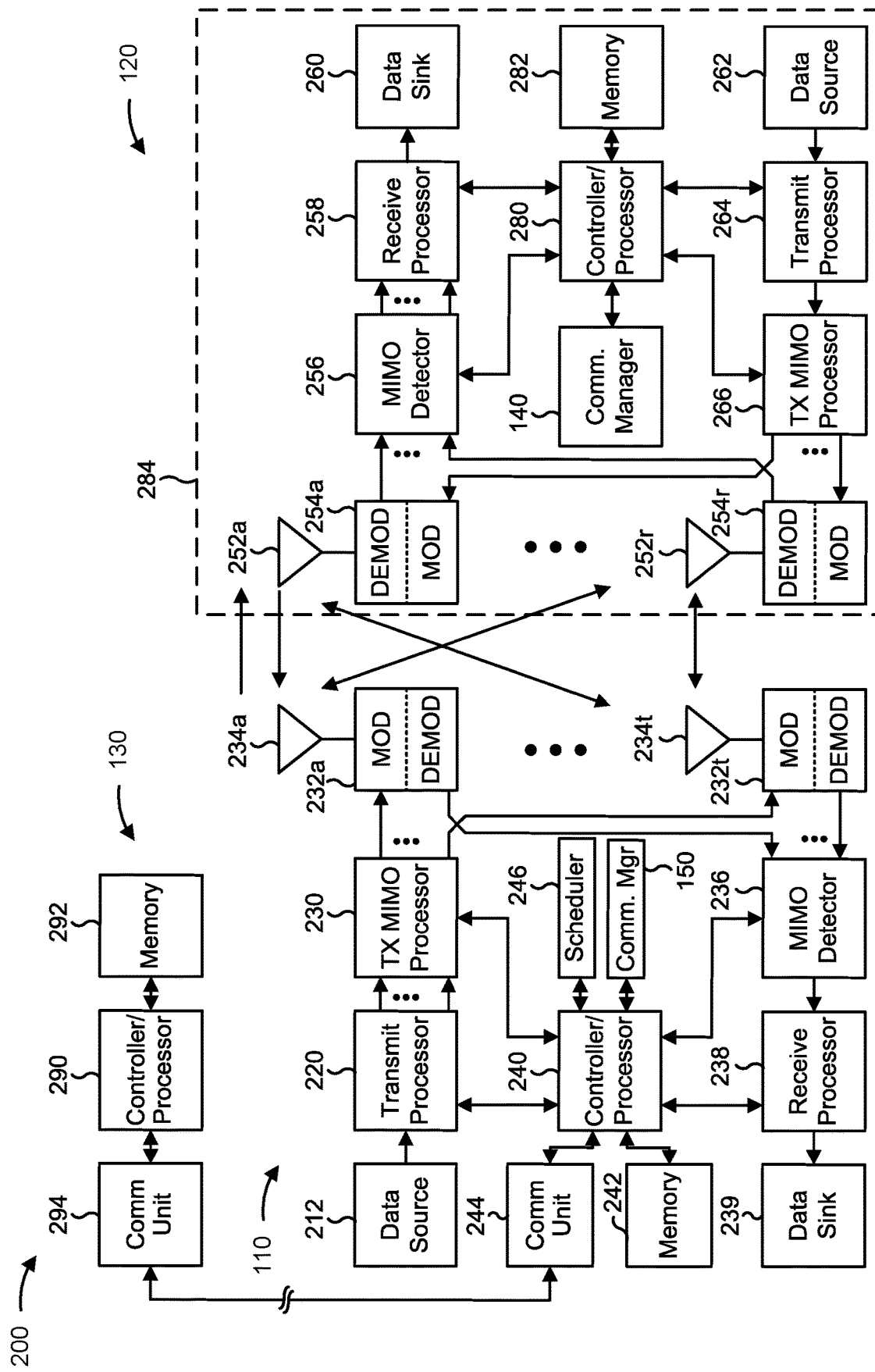
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6B and 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6B and 7-13).

The controller/processor 240 of the network node 110, the controller/processor 280 of the UE 120, and/or any other component(s) of FIG. 2 may perform one or more techniques associated with mobile station relaying verification, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples. In some aspects, a mobile station described herein is the UE 120, is included in the UE 120, or includes one or more components of the UE 120 shown in FIG. 2.

In some aspects, a mobile station (e.g., the UE 120) includes means for receiving, by the mobile station and from a first network entity, data to be relayed to a second network entity; means for transmitting, by the mobile station, the data to the second network entity; means for receiving, by the mobile station and from the second network entity, a digitally signed acknowledgement of reception of the data; and/or means for transmitting, by the mobile station, the digitally signed acknowledgement to the first network entity. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a mobile station (e.g., the UE 120) includes means for receiving, by the mobile station and from a relay mobile station, data originating from a network entity and relayed by the relay mobile station; and/or means for transmitting, by the mobile station and to the relay mobile station, a digitally signed acknowledgement of reception of the data. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the network node 110) includes means for transmitting, by the network entity and to a relay mobile station, data to be relayed to a remote mobile station; and/or means for receiving, by the network entity and from the relay mobile station, a digitally signed acknowledgement of reception of the data by the remote mobile station. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
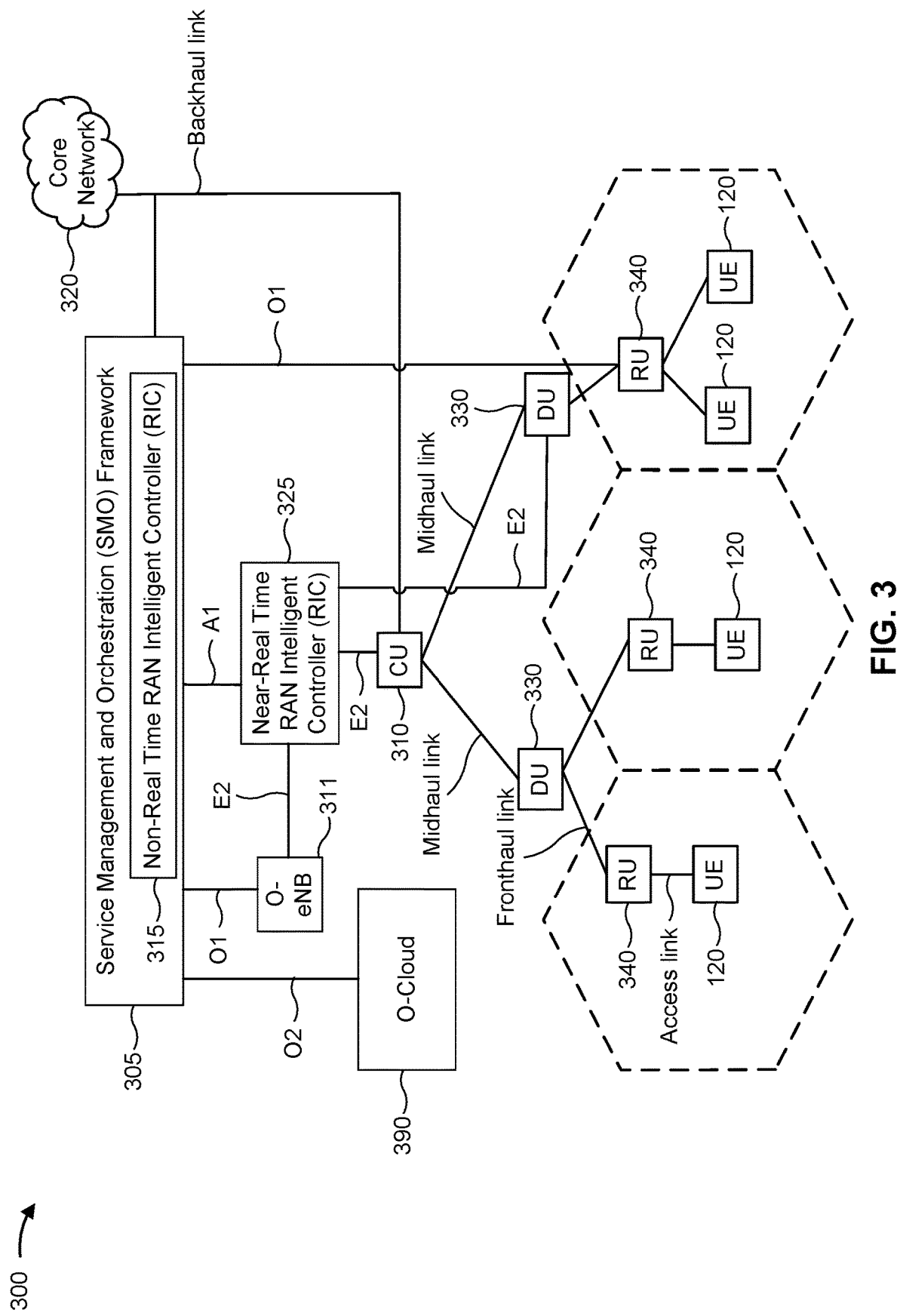
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
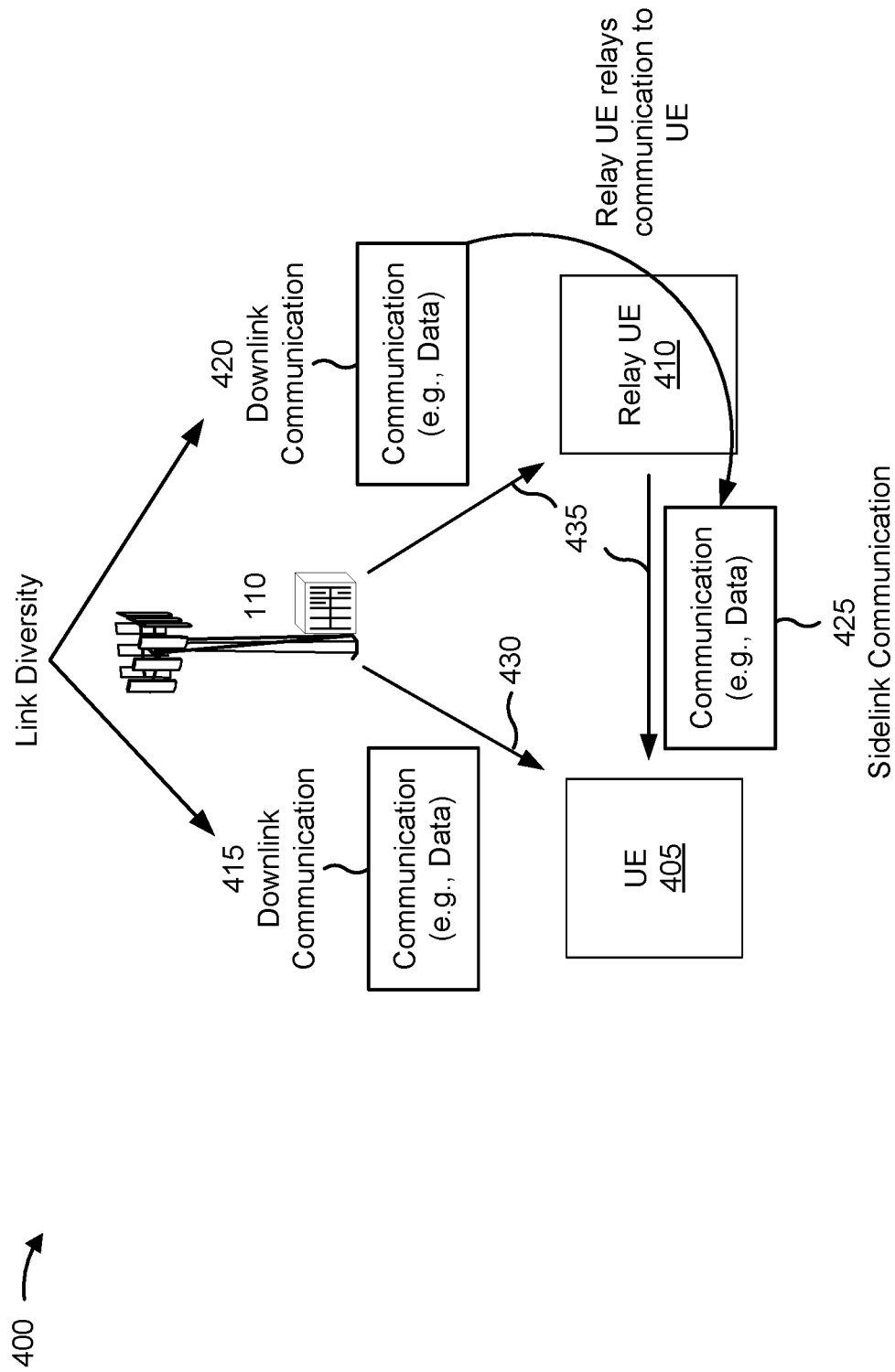
FIG. 4 is a diagram illustrating an example of a relay UE that relays communications between a UE and a network node, in accordance with the present disclosure.

FIG. 4 is a diagram illustrating an example 400 of a relay UE that relays communications between a UE and a network node, in accordance with the present disclosure. As shown, example 400 includes a UE 405, a relay UE 410, and a network node 110. In example 400, the UE 405 is an Rx UE, and the relay UE 410 is a Tx UE. In some aspects, the UE 405 is one UE 120, and the relay UE 410 is another UE 120. In some aspects, the UE 405 may be referred to as a remote UE.

As shown in FIG. 4, the UE 405 may receive a communication (e.g., data and/or control information) directly from the network node 110 as a downlink communication 415. Additionally, or alternatively, the UE 405 may receive a communication (e.g., data and/or control information) indirectly from the network node 110 via the relay UE 410. For example, the network node 110 may transmit the communication to the relay UE 410 as a downlink communication 420, and the relay UE 410 may relay (e.g., forward or transmit) the communication to the UE 405 as a sidelink communication 425.

In some aspects, the UE 405 may communicate directly with the network node 110 via a direct link 430. For example, the downlink communication 415 may be transmitted via the direct link 430. A communication transmitted via the direct link 430 between the UE 405 and the network node 110 (e.g., in the downlink communication 415) does not pass through and is not relayed by the relay UE 410. In some aspects, the UE 405 may communicate indirectly with the network node 110 via an indirect link 435. For example, the downlink communication 420 and the sidelink communication 425 may be transmitted via different segments of the indirect link 435. A communication transmitted via the indirect link 435 between the UE 405 and the network node 110 (e.g., in the downlink communication 420 and the sidelink communication 425) passes through and is relayed by the relay UE 410. Using the communication scheme shown in FIG. 4 may improve network performance and increase reliability by providing the UE 405 with link diversity for communicating with the network node 110.

In some cases, the UE 405 may receive a communication (e.g., the same communication) from the network node 110 via both the direct link 430 and the indirect link 435. In other cases, the network node 110 may select one of the links (e.g., either the direct link 430 or the indirect link 435), and may transmit a communication to the UE 405 using only the selected link. Alternatively, the network node 110 may receive an indication of one of the links (e.g., either the direct link 430 or the indirect link 435), and may transmit a communication to the UE 405 using only the indicated link. The indication may be transmitted by the UE 405 and/or the relay UE 410. In some aspects, such selection and/or indication may be based at least in part on channel conditions and/or link reliability.

In some cases, the relay UE may use layer 2 (L2) relaying to relay communications between the network node 110 and the UE 405. In cases in which L2 relaying is used, the relay relationship between the relay UE 410 and the UE 405 may be known to network node 110, and the network node 110 may store a context of the UE 405. In some cases, the relay UE may use layer 3 (L3) relaying to relay communications between the network node and the UE 405. In cases in which L3 relaying is used, the network node is not aware of (e.g., does not store) the context of the remote UE (e.g., the UE 405).

As indicated above, FIG. 4 is provided as an example. Other examples may differ from what is described with respect to FIG. 4.

Figure 5:
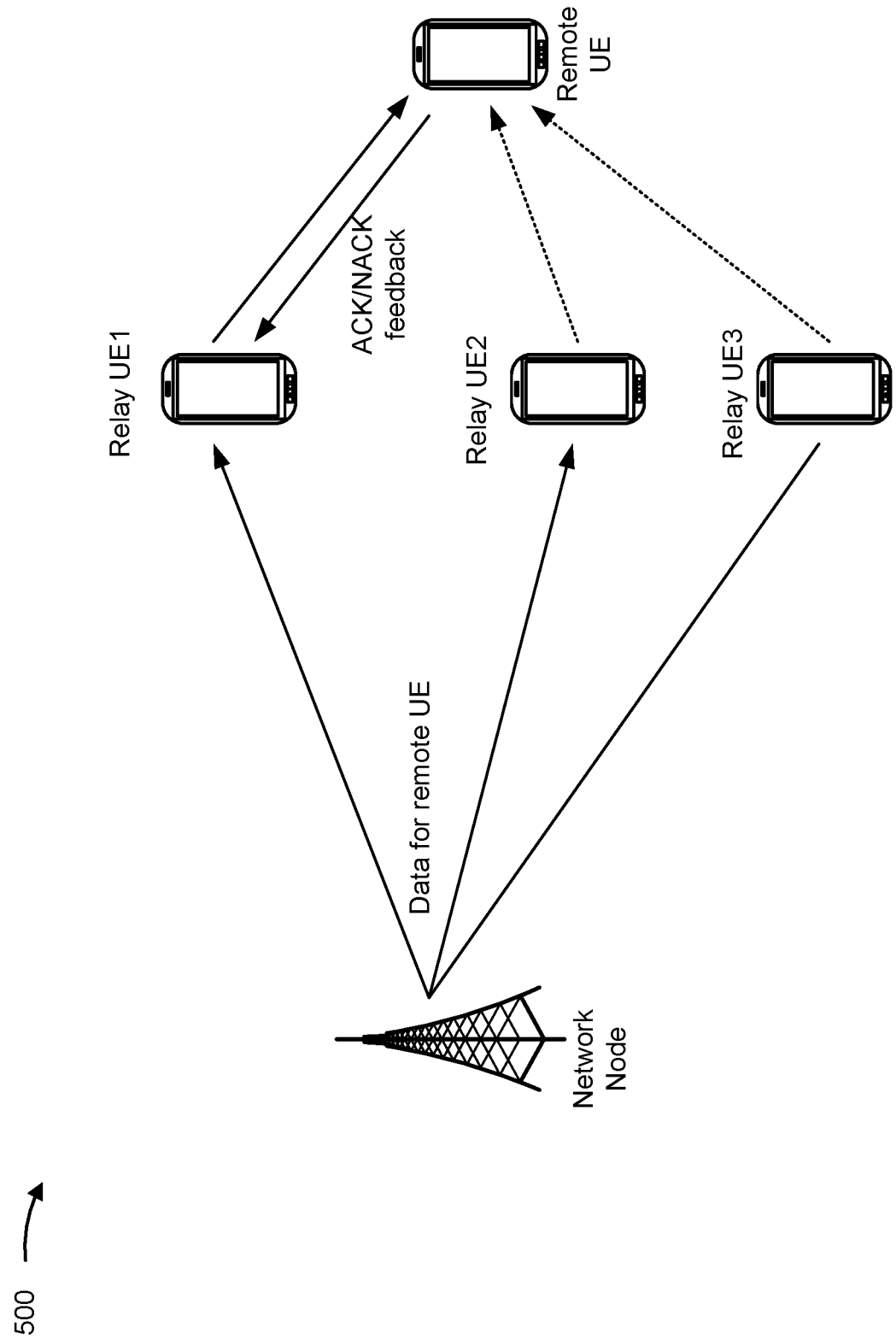
FIG. 5 is a diagram illustrating an example of incentive-based relaying, in accordance with the present disclosure.

FIG. 5 is a diagram illustrating an example 500 of incentive-based relaying, in accordance with the present disclosure.

In some cases, a relay UE (or a user of the relay UE) may receive an incentive or reward for relaying data between a network node and a remote UE. For example, a network charging function (CHF) in a core network (e.g., a 5G core network) may provide a monetary payment for relaying, by a relay UE, data from a network node to a remote UE. In some examples, incentives for relaying rely on correlation of multiple reports from different entities. For example, the CHF may support reporting from the relay UE and the remote UE (e.g., via the relay UE, or directly). In this case, the CHF may correlate the reports (e.g., core network charging reports) from the relay UE and the remote UE to verify the amount of traffic relayed to the remote UE via a particular relay UE. However, in some cases, proof of relaying may not be available to verify that a relay UE relayed traffic to a remote UE. For L2 relaying, the relationship between the relay UE and the remote UE is only known to the RAN node (e.g., the gNB), and the CHF may not be able to determine which relay UE relayed traffic to a remote UE. For L2 relaying, if there is no transport/application ACK, the CHF may not be able to verify if a relay UE has attempted relaying, or if a remote UE is under-reporting the amount of traffic relayed to the remote UE. Additionally, RAN local traffic (e.g., traffic that does not pass through the core network), such as system information (SI) broadcast by the RAN node and relayed by a relay UE to a remote UE, cannot be corroborated by core network charging reports.

In some cases, there may be multiple possible relay UEs that can relay data between a network node and a remote UE. As shown in FIG. 5, possible relay UEs for relaying data between a network node and a remote UE may include a first relay UE (relay UE1), a second relay UE (relay UE2), and a third relay (relay UE3). L2 relaying and/or L3 relaying may be supported for relaying the data between the network node and the remote UE. As shown in FIG. 5, the network node may transmit data for the remote UE to relay UE1, relay UE2, and relay UE3. The data to be relayed to the remote UE may be unicast data (that is intended for the remote UE) and/or broadcast data. In some examples, the data to be relayed to the remote UE may include core network traffic and/or RAN local traffic, such as broadcast information link SI or broadcast traffic (e.g., from 5G multicast broadcast service (MBS)). In some examples, L3 relaying may enable direct local routing of traffic to the remote UE.

As shown in FIG. 5, relay UE1, relay UE2, and relay UE3 may each attempt to relay the data, received from the network node, to the remote UE. In example 500, relay UE1 may successfully relay the data to the remote UE, and relay UE1 may receive acknowledgement (ACK) or negative acknowledgement (NACK) feedback (ACK/NACK feedback) (e.g., hybrid automatic repeat request (HARD) ACK/NACK feedback) from the remote UE. In this case, relay UE1 (e.g., the relay UE that successfully relayed the traffic to the remote UE) may be able to claim an incentive or reward from the network node or core network by providing proof of relaying (e.g., in a core network charging report). However, another UE (e.g., relay UE2 or relay UE3) that did not successfully relay the data to the remote UE may provide false proof of relaying for the data to attempt to claim the incentive, and the network (e.g., the CHF) may not be able to determine which relay UE relayed the traffic to the remote UE.

As indicated above, FIG. 5 is provided as an example. Other examples may differ from what is described with respect to FIG. 5.

In some examples, in a case in which a relay UE relays data to a remote UE, a core network function (e.g., the CHF, a policy control function (PCF), or a direct discovery name management function (DDNMF)) correlates and verifies the relaying operation based on reporting by both the relay UE and the remote UE. However, in such examples, the verification requires that both the relay UE and the remote UE report the same information. This results in a higher network overhead (e.g., as compared to only one of the relay UE or the remote UE reporting the information), and the network may not know whether to trust the relay UE or the remote UE when there is a discrepancy between the information reported by the relay UE and the information reported by the remote UE. Furthermore, such reporting may incur a high overhead of radio resources for relayed uplink communications, as well as high power consumption at the remote UE. In addition, in some cases, the network may be able to verify the proof of relaying by correlating reports from the relay UE and the remote UE, as described above in connection with FIG. 5.

Some techniques and apparatuses described herein enable UE relaying verification based at least in part on a digitally signed acknowledgement from the remote UE. A relay UE may receive, from a network node, data to be relayed to a remote UE, and the relay UE may transmit the data to the remote UE. The relay UE may receive, from the remote UE, a digitally signed acknowledgement of reception of the data. The digitally signed acknowledgment may include a message and a digital signature. The message may provide proof of the relaying of the data to the remote UE by the relay UE, and the digital signature may cryptographically protect the proof of relaying included in the message. The relay UE may transmit the digitally signed acknowledgement to the network node, and the network node (or a core network device) may verify the relaying based at least in part on the digitally signed acknowledgement. As a result, the network overhead for verifying the relaying may be reduced, as compared with verification based on reports received from the relay UE and the remote UE. Furthermore, because the proof of relaying is cryptographically protected by the digital signature generated by the remote UE, the verification prevents a UE other than the relay UE from claiming a reward or incentive for the relaying. In addition, the proof of relaying included in the digitally signed acknowledgement may be used to verify relaying in cases of L2 relaying, in cases of L3 relaying, in cases of relaying core network traffic, and in cases of relaying RAN local traffic.

Figure 6A:
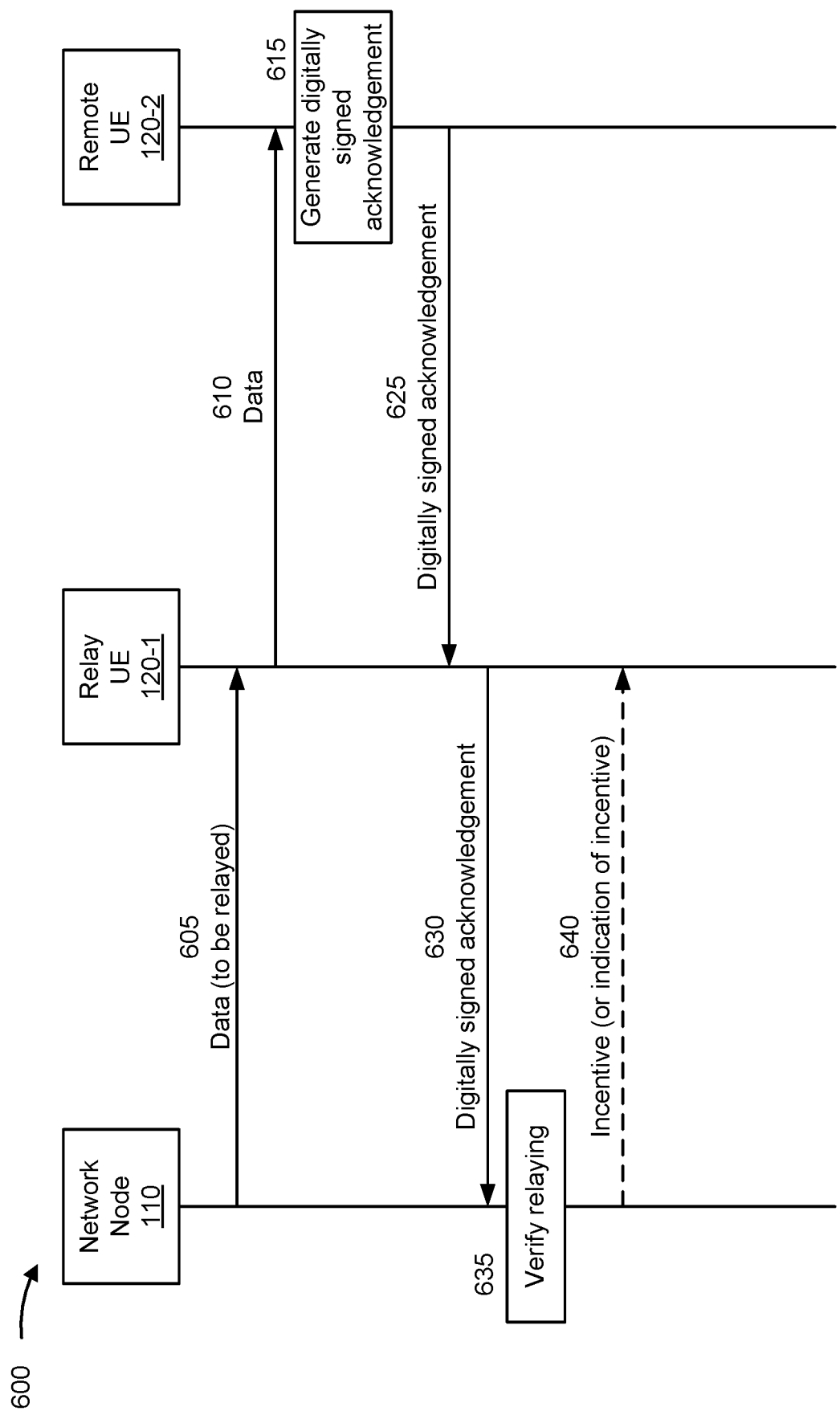
FIGS. 6A-6B are diagrams illustrating an example associated with UE relaying verification, in accordance with the present disclosure.
Figure 6B:
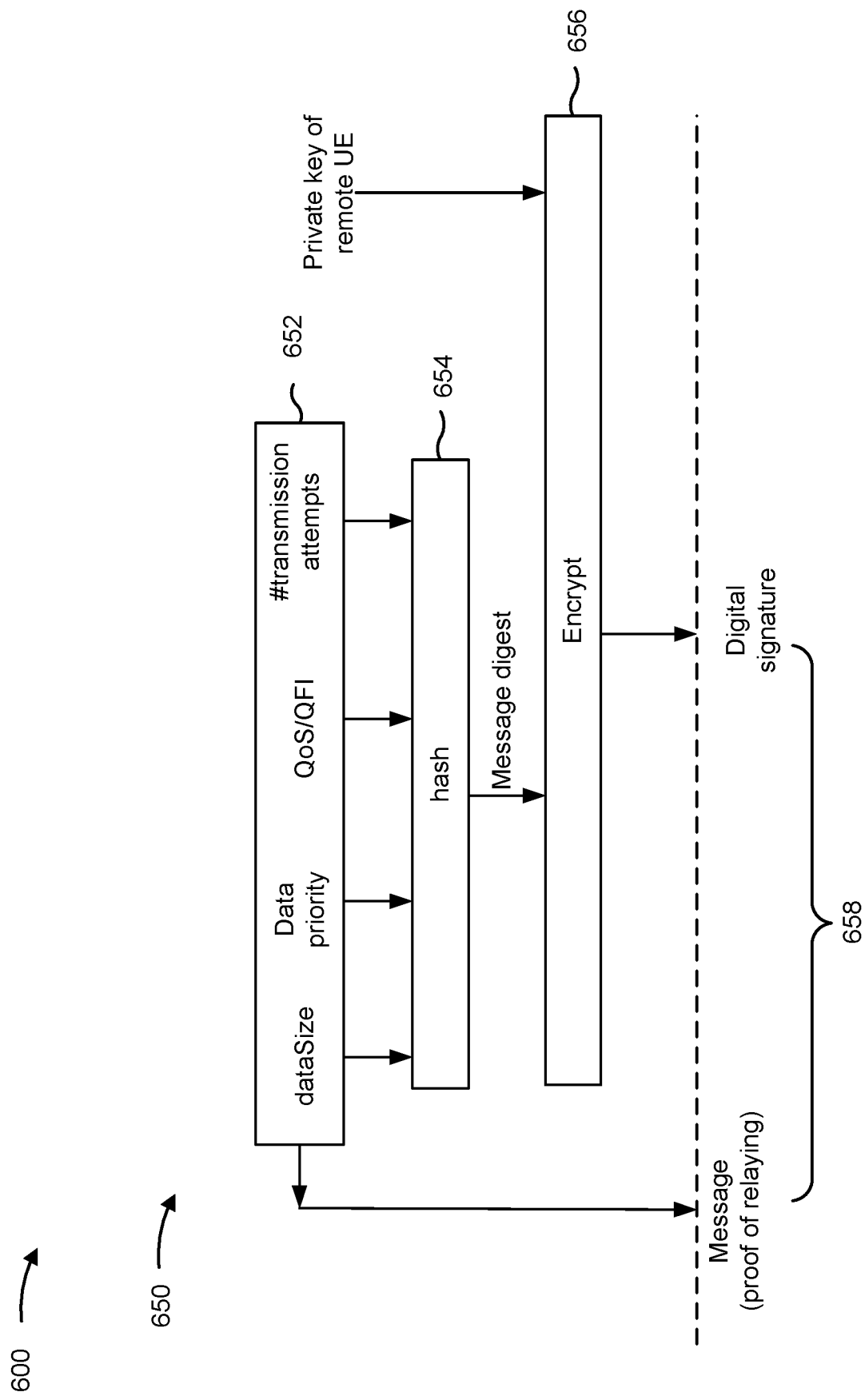

FIGS. 6A-6B are diagrams illustrating an example 600 associated with UE (or mobile station) relaying verification, in accordance with the present disclosure. As shown in FIG. 6A, example 600 includes communication between a network node 110, a relay UE 120-1, and a remote UE 120-2. In some aspects, the network node 110, the relay UE 120-1, and the remote UE 120-2 may be included in a wireless network, such as wireless network 100. The network node and the UEs 120 (e.g., the relay UE 120-1 and/or the remote UE 120-2) may communicate via wireless access links, which may include uplinks and downlinks. The relay UE 120-1 and the remote UE 120-2 may communicate via a wireless access link, which may include a sidelink. In some aspects, the relay UE 120-1 may be a mobile station (e.g., a relay mobile station), may include a mobile station, or may be included in a mobile station. In some aspects, the remote UE 120-2 may be a mobile station (e.g., a remote mobile station), may include a mobile station, or may be included in a mobile station. In some aspects, the network node 110 may be a base station, a disaggregated base station, or one or more units of a disaggregated base station (e.g., a CU, a DU, an RU), or a combination thereof.

In some aspects, the relay UE 120-2 may perform operations, as described in connection with FIGS. 6A and 6B, relating to verification of relaying, by the relay UE 120-1, of data from a first network entity to a second network entity. In some aspects, as shown in example 600, the first network entity may be the network node 110, and the second entity may be the remote UE 120-2. In this case, the verification may relate to relaying, by the relay UE 120-1, of downlink data from the network node 110 to the remote UE 120-2. In other aspects, the first network entity may be a UE (e.g., a transmitting UE) and the second network entity may be the remote UE 120-2 (e.g., for verification of relaying of sidelink data by the relay UE 120-1).

As shown in FIG. 6A, and by reference number 605, the network node 110 data, and the relay UE 120-1 may receive the data transmitted by the network node 110. The data may be data to be relayed to the remote UE 120-2. The relay UE 120-1 may receive the data (e.g., a data packet) and determine to relay the data to the remote UE 120-2.

In some aspects, the determination, by the relay UE 120-1, to relay the data to the remote UE 120-2 may be based at least in part on information, included in the data, that identifies the remote UE 120-2. For example, the information that identifies the remote UE 120-2 may be included in a control message that accompanies the data, or the information that identifies the remote UE 120-2 may be included in the data packet (e.g., in a PDCP header) that includes the data. In such examples, the information may identify the remote UE 120-2 as a destination for the data transmitted by the network node 110. For example, the data may be unicast data with a destination of the remote UE 120-2.

In some aspects, the data may be broadcast data transmitted (e.g., broadcast) by the network node 110, and the determination, by the relay UE 120-1, to relay the data to the remote UE 120-2 may be based at least on a request, from the remote UE 120-2, for the broadcast data. In this case, the remote UE 120-2 may transmit (e.g., in a unicast transmission to the relay UE 120-1 or in a broadcast transmission) a request for broadcast data being transmitted by the network node 110. For example, the broadcast data may include SI broadcast by the network node 110. The relay UE 120-1 may receive, from the remote UE 120-2, the request for the broadcast data, and the relay UE 120-1 may determine to relay the broadcast data to the remote UE 120-2 in connection with receiving the request for the broadcast data.

As shown by reference number 610, the relay UE 120-1 may transmit (e.g., relay) the data to the remote UE 120-2. The remote UE 120-2 may receive the data originating from the network node 110 and relayed by the relay UE 120-1. The relay UE 120-1 may transmit the data to the remote UE 120-2 (and the remote UE 120-2 may receive the data from the relay UE 120-1), based at least in part on the determination by the relay UE 120-1 to relay the data.

As further shown by reference number 615, the remote UE 120-2 may generate a digitally signed acknowledgement of reception of the data that is relayed from the relay UE 120-1. The remote UE 120-2 may be configured to transmit, to the relay UE 120-1, feedback including ACK/NACK feedback (e.g., HARQ ACK/NACK feedback) based at least in part on receiving the data from the relay UE 120-1. The remote UE 120-2 may determine whether the feedback is to include an ACK (e.g., in connection with successful decoding of the data) or a NACK (e.g., in connection with unsuccessful decoding of the data). In some aspects, the remote UE 120-2 may generate the digitally signed acknowledgement of the reception of the data relayed from the relay UE 120-1 based at least in part on determining that feedback for the relayed data is to include an ACK (e.g., based at least in part on successfully decoding the relayed data).

In some aspects, the digitally signed acknowledgement may include a message and a digital signature. The message may include one or more parameters associated with the transmission of the data from the relay UE 120-1 to the remote UE 120-2 (e.g., one or more parameters associated with the relay UE 120-1 relaying the data to the remote UE 120-2). For example, the message may include one or more parameters, such as a size of the data, a priority associated with the data, a quality of service (QoS) parameter associated with the data, a QoS flow identifier (QFI) associated with the data, a number of radio resources used for the transmission of the data from the relay UE 120-1 to the remote UE 120-2, and/or a number of transmission attempts used for the transmission of the data from the relay UE 120-1 to the remote UE 120-2, among other examples. In some aspects, the message may include one or more parameters that provide (e.g., to the network node 110) proof of the relaying by the relay UE 120-1. In some aspects, the message may include one or more parameters to be used (e.g., by the network node 110 or a core network device) to determine an incentive associated with relaying the data. In some aspects, the digital signature includes a message digest, associated with the message, that is encrypted based at least in part on a private security key associated with the remote UE 120-2. The message digest may be a result of applying a hash function to the message (e.g., message digest=hash(message)). The digital signature may provide security for the proof of relaying information included in the message. For example, the digital signature may be used by the network node 110 to verify that the proof of relaying information included in the message originated from the remote UE 120-2 and has not been altered prior to the digitally signed acknowledgement being transmitted to the network node 110.

FIG. 6B shows an example 650 of generating the digitally signed acknowledgement by the remote UE 120-2. As shown by reference number 652, in example 650 of FIG. 6B, the message may include an indication of the size of the data relayed to the remote UE 120-2 (e.g., shown as dataSize in FIG. 6B), the priority associated with the data, the QoS parameter or QFI associated with the data, and the number of transmission attempts used for the transmission of the data from the relay UE 120-1 to the remote UE 120-2. As shown by reference 654, the remote UE 120-2 may compute/determine the message digest corresponding to the message by applying a hash function to the message. For example, the remote UE 120-2 may determine the message digest using the secure hash algorithm 1 (SHA-1) hash function, or another hash function. The message digest results from applying the hash function to the message. As shown by reference number 656, the remote UE 120-2 may then encrypt the message digest using the private key of the remote UE 120-2 to generate the digital signature. For example, the remote UE 120-2 may use the Rivest-Shamir-Adelman (RSA) encryption algorithm, or another encryption algorithm, to encrypt the message digest based at least in part on the private key of the remote UE 120-2. The digital signature may be an encrypted signature that results from encrypting the message digest. As shown by reference number 658, the remote UE 120-2 may then attach the digital signature to the message, resulting in the digitally signed acknowledgement.

Returning to FIG. 6A, as shown by reference number 625, the remote UE 120-2 may transmit, to the relay UE 120-1, the digitally signed acknowledgement of reception of the data. For example, the remote UE 120-2 may transmit the digitally signed acknowledgement to the relay UE 120-1 in a case in which the remote UE 120-2 determined that the feedback for the data relayed to the remote UE 120-2 is an ACK (e.g., in a case in which the remote UE 120-2 successfully decodes the relayed data). The relay UE 120-1 may receive, from the remote UE 120-2, the digitally signed acknowledgement of reception of the data by the remote UE 120-2.

As shown by reference number 630, the relay UE 120-1 may transmit, to the network node 110, the digitally signed acknowledgement of reception of the data by the remote UE 120-2. The network node 110 may receive, from the remote UE 120-2, the digitally signed acknowledgement of reception of the data by the remote UE 120-2. In some aspects, the relay UE 120-1 may verify that the message is consistent with the data relayed to the remote UE 120-2 prior to transmitting the digitally signed acknowledgement to the network node 110. For example, the relay UE 120-1 may verify that the one or more parameters included in the message (e.g., the one or more parameters associated with the transmission of the data from the relay UE 120-1 to the remote UE 120-2) are consistent with the relaying of the data from the relay UE 120-1 to the remote UE 120-2. In this case, the relay UE 120-1 may transmit the digitally signed acknowledgement to the network node 110 based at least in part on the verification of the one or more parameters included in the message. In this way, the relay UE 120-1 may verify the accuracy of the one or more parameters that provide the proof of relaying prior to transmitting the digitally signed acknowledgement, including the message and the digital signature, to the network node 110.

In some aspects, the relay UE 120-1 may report the digitally signed acknowledgement for the relayed data to the network node 110 using real-time (or near real-time) reporting. For example, once the relay UE 120-1 receives the digitally signed acknowledgment from the remote UE 120-2, the relay UE 120-1 may transmit the digitally signed acknowledgement to the network node 110. In this case, if the relay UE 120-1 relays multiple data packets to the remote UE 120-2 and/or one or more other remote UEs, the relay UE 120-1 may separately transmit, to the network node 110, the respective digitally signed acknowledgement for each relayed data packet. In some aspects, the relay UE 120-1 may report the digitally signed acknowledgement for the relayed data to the network node 110 using non-real-time reporting. For example, the relay UE 120-1 may aggregate all of the digitally signed acknowledgments for relaying to one or more remote UEs (the remote UE 120-2 and/or one or more other remote UEs) over a time period (e.g., in one day), and the relay UE 120-1 may transmit the aggregated digitally signed acknowledgments together in a communication (e.g., an uplink communication) to the network node 110. In this case, the relay UE 120-1 may transmit the digitally signed acknowledgement for reception of the relayed data to the remote UE 120-2 to the network node 110 in a communication that includes the digitally signed acknowledgement and one or more other digitally signed acknowledgements associated with relaying other data.

As further shown in FIG. 6A, and by reference number 635, the network node 110 may verify the relaying of the data to the remote UE 120-2 by the relay UE 120-1. The network node 110, to verify the relaying of the data, may decrypt the message digest based at least in part on a public security key associated with the remote UE 120-2. In some aspects, the remote UE 120-2 may provide the public security key associated with the remote UE 120-2 to the network node 110. For example, the remote UE 120-2 may provide the public security key associated with the remote UE 120-2 to the network node 110 when an initial registration is formed or an initial connection is established between the remote UE 120-2 and the network node 110. In some aspects, the remote UE 120-2 may transmit the public security key associated with the remote UE 120-2 directly to the network node 110. In some aspects, the remote UE 120-2 may transmit the public security key to the network node 110 via one or more relay UEs (e.g., the relay UE 120-1 and or one or more other relay UEs). The network node 110 may receive public security key associated with the remote UE 120-2. The network node 110 may perform decryption on the digital signature (e.g., using a decryption algorithm) based at least in part on the public security key associated with the remote UE 120-2, resulting in the message digest.

The network node 110, to verify the relaying of the data, may then verify the one or more parameters included in the message in the digitally signed acknowledgment based at least in part on the decrypted message digest. For example, the network node 110 may apply the hash function (e.g., the SHA-1 hash function) to the message, and compare the result of applying the hash function to the message (e.g., another message digest generated by the network node 110) to the decrypted message digest to verify whether the message digest generated by the network node 110 by applying the hash function to the message is the same as the decrypted message digest. The one or more parameters provide proof of relaying of the data to the remote UE 120-2 by the relay UE 120-1. Because the message digest included in the digitally signed acknowledgement is decrypted based at least in part on the private key associated with the remote UE 120-2, the relay UE 120-1 cannot alter the message digest included in the digitally signed acknowledgement. Accordingly, by verifying the message based at least in part on the decrypted message digest, the network node 110 may verify that the one or more parameters (e.g., the proof of relaying) included in the message by the remote UE 120-2 have not been altered prior to the digitally signed acknowledgement being transmitted to the network node 110.

In some aspects, one or more network devices (e.g., network entities) other than (or in addition to) the network node 110 may perform the verification of the relaying based at least in part on the digitally signed acknowledgement. For example, in some aspects, the network node 110 may transmit the digitally signed acknowledgement of reception of the data by the remote UE 120-2 to a core network device, such as a device associated with a CHF, a PCF, a DDNMF, or another core network function, and the core network device may perform the verification of the relaying of the data from the relay UE 120-1 to the remote UE 120-2 based at least in part on the digitally signed acknowledgment.

As further shown in FIG. 6A, and by reference number 640, the network node 110 may transmit an incentive (or an indication of an incentive) to the relay UE 120-1. The relay UE 120-1 may receive the incentive (or the indication of the incentive). In some aspects, the network node 110 may transmit the incentive (or the indication of the incentive) to the relay UE 120-1 based at least in part on verifying the relaying of the data to the remote UE 120-2 by the relay UE 120-1. For example, the network node 110 may transmit the incentive (or the indication of the incentive) to the relay UE 120-1 based at least in part on the verification of the one or more parameters in the message included in the message. In some aspects, the incentive for relaying the data to the remote UE 120-2 by the relay UE 120-1 may include at least one of a monetary incentive, a QoS incentive, or digital tokens that may be redeemed for monetary or QoS rewards, among other examples.

In some aspects, a device other than the network node 110 may provide the incentive to the relay UE 120-1 or the user of the relay UE 120-1 based at least in part on the verification of the relaying of the data. For example, a core network device associated with a CHF may provide a monetary incentive for relaying the data to an account of the user of the relay UE 120-1. In such examples, the network node 110 may transmit an indication of the incentive to the relay UE 120-1, and the relay UE 120-1 may receive the indication of the incentive.

As indicated above, FIGS. 6A-6B are provided as an example. Other examples may differ from what is described with respect to FIGS. 6A-6B.

Figure 7:
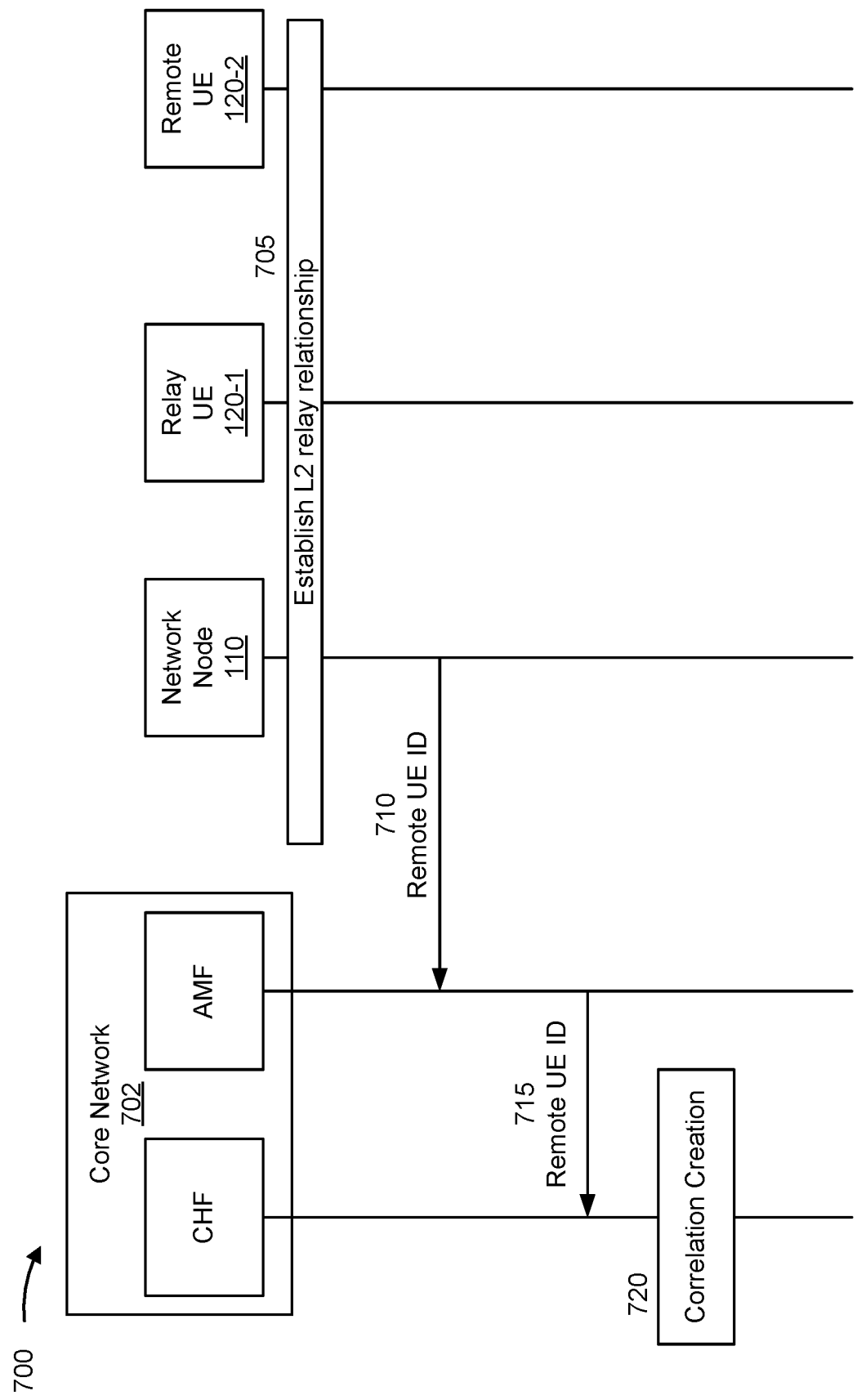
FIG. 7 is a diagram illustrating an example associated with layer 2 (L2) relay enhancements for UE relaying verification, in accordance with the present disclosure.

FIG. 7 is a diagram illustrating an example 700 associated with L2 relay enhancements for UE (or mobile station) relaying verification, in accordance with the present disclosure. As shown in FIG. 7, example 700 includes communication between core network 702, a network node 110, a relay UE 120-1, and a remote UE 120-2. In some aspects, the network node 110 may communicate with the relay UE 120-1 and/or the remote UE 120-2 via wireless access links, which may include uplinks and downlinks. The relay UE 120-1 and the remote UE 120-2 may communication via a sidelink. The core network (e.g., a 5G core network) may include an access and mobility function (AMF) and a CHF, as well as other core network functions. The AMF and the CHF may be performed on one or more core network devices.

As shown in FIG. 7, and by reference number 705, the network node 110, the relay UE 120-1, and the remote UE 120-2 may establish an L2 relay relationship, in which the relay UE 120-1 relays communications between the network node 110 and the remote UE 120-2. In some aspects, the network node 110 may be, may include, or may be included in a RAN node associated with the relay UE 120-1 (e.g., a RAN node with which the relay UE 120-1 has established a connection). In this case, the network node 110 may store a context of the remote UE 120-2 associated with the L2 relay relationship.

As shown by reference number 710, the network node 110 may transmit, to the core network 702, an indication of a remote UE ID associated with the remote UE 120-2. For example, the network node 110 may transmit the indication of the remote UE ID to report the L2 relay relationship to the core network. In some aspects, the network node 110 may transmit the indication of the remote UE ID of the remote UE 120-2 to the AMF such that the remote UE ID of the remote UE 120-2 may be associated with a context of the remote UE 120-2. For example, the network node 110 may be triggered to report the remote UE ID of the remote UE 120-2, to be associated with the context of the relay UE 120-1, to the AMF in connection with the L2 relay relationship being established. In some aspects, the remote UE ID may be a general public subscription ID (GPSI), as the remote UE 120-2 and the relay UE 120-1 may not be served by the same public land mobile network (PLMN) in some cases.

As shown by reference number 715, the AMF may transmit/report the remote UE ID of the remote UE 120-2 to the CHF. In some aspects, the AMF may associate the remote UE ID with the context of the relay UE 120-1 as an L2 remote UE ID. In some aspects, the AMF may be triggered to report the L2 remote UE ID to the CHF for correlation creation when the AMF receives the remote UE ID from the network node 110.

As shown by reference number 720, the CHF may create a correlation between the relay UE 120-1 (e.g., a UE ID of the relay UE 120-1) and the remote UE ID (e.g., the GPSI) of the remote UE 120-2 based at least in part on receiving the remote UE ID from the AMF. The CHF may store the correlation between the relay UE 120-1 and the remote UE ID of the remote UE 120-2. In some aspects, the CHF may correlate reports, from the relay UE 120-1 and the remote UE 120-2, of relaying data to the remote UE 120-2 by the relay UE 120-1 based at least in part on the correlation between the relay UE 120-1 and the remote UE ID of the remote UE 120-2, and the CHF may determine and/or provide an incentive (e.g., to the relay UE 120-1) for the relaying based at least in part on correlating the reports of the relaying. In this way, verification, by the CHF, of the relaying to the remote UE 120-2 by the relay UE 120-1 may be based at least in part on the reporting, by the network node 110, of the L2 relay relationship to the core network.

In some aspects, the L2 relay enhancements described above in connection with FIG. 7 may be combined with the operations described above in connection with FIGS. 6A and 6B or may be performed independently with respect to the operations described above in connection with FIGS. 6A and 6B.

As indicated above, FIG. 7 is provided as an example. Other examples may differ from what is described with respect to FIG. 7.

Figure 8:
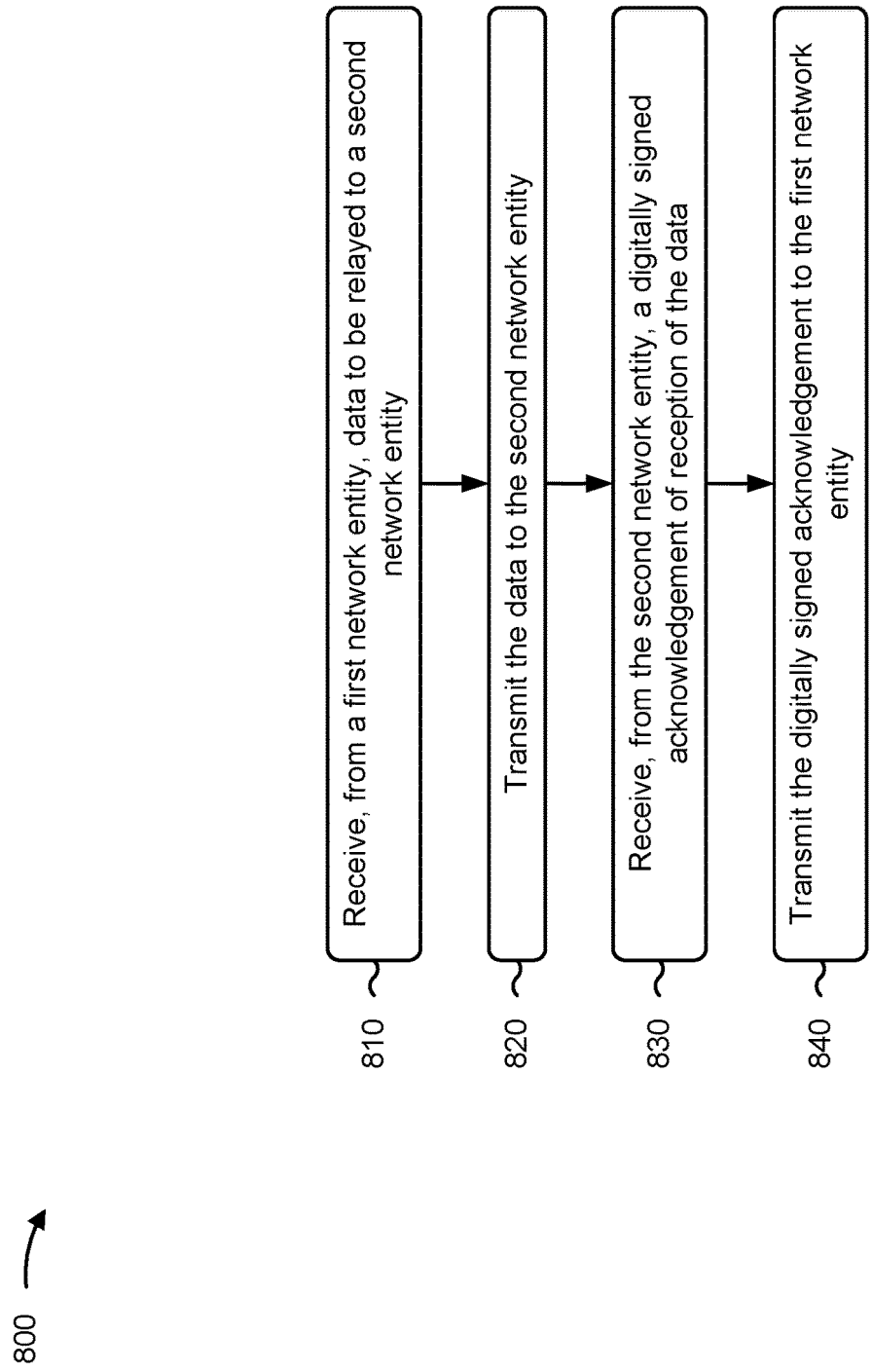
FIG. 8 is a diagram illustrating an example process performed, for example, by a mobile station, in accordance with the present disclosure.

FIG. 8 is a diagram illustrating an example process 800 performed, for example, by a mobile station, in accordance with the present disclosure. Example process 800 is an example where the mobile station (e.g., relay UE 120-1) performs operations associated with mobile station relaying verification.

As shown in FIG. 8, in some aspects, process 800 may include receiving, from a first network entity, data to be relayed to a second network entity (block 810). For example, the mobile station (e.g., using communication manager 1108 and/or reception component 1102, depicted in FIG. 11) may receive, from a first network entity, data to be relayed to a second network entity, as described above.

As further shown in FIG. 8, in some aspects, process 800 may include transmitting the data to the second network entity (block 820). For example, the mobile station (e.g., using communication manager 1108 and/or transmission component 1104, depicted in FIG. 11) may transmit the data to the second network entity, as described above.

As further shown in FIG. 8, in some aspects, process 800 may include receiving, from the second network entity, a digitally signed acknowledgement of reception of the data (block 830). For example, the mobile station (e.g., using communication manager 1108 and/or reception component 1102, depicted in FIG. 11) may receive, from the second network entity, a digitally signed acknowledgement of reception of the data, as described above.

As further shown in FIG. 8, in some aspects, process 800 may include transmitting the digitally signed acknowledgement to the first network entity (block 840). For example, the mobile station (e.g., using communication manager 1108 and/or transmission component 1104, depicted in FIG. 11) may transmit the digitally signed acknowledgement to the first network entity, as described above.

Process 800 may include additional aspects, such as any single aspect or any combination of aspects described below and/or in connection with one or more other processes described elsewhere herein.

In a first aspect, the data comprises information that identifies the second network entity, and transmitting the data to the second network entity comprises transmitting the data to the second network entity based at least in part on the information that identifies the second network entity.

In a second aspect, alone or in combination with the first aspect, the data comprises broadcast data transmitted by the first network entity, and process 800 includes receiving, from the second network entity, a request for the broadcast data, wherein transmitting the data to the second network entity comprises transmitting the data to the second network entity based at least in part on receiving the request for the broadcast data.

In a third aspect, alone or in combination with one or more of the first and second aspects, the digitally signed acknowledgement comprises a message comprising indications of one or more parameters associated with transmission of the data from the mobile station to the second network entity, and a digital signature associated with the second network entity.

In a fourth aspect, alone or in combination with one or more of the first through third aspects, the one or more parameters comprise at least one of a size of the data, a priority associated with the data, a QoS parameter associated with the data, a number of radio resources used for the transmission of the data from the mobile station to the second network entity, or a number of transmission attempts used for the transmission of the data from the mobile station to the second network entity.

In a fifth aspect, alone or in combination with one or more of the first through fourth aspects, the digital signature comprises a message digest, associated with the message, that is encrypted based at least in part on a private security key associated with the second network entity.

In a sixth aspect, alone or in combination with one or more of the first through fifth aspects, the message digest is a result of applying a hash function to the message.

In a seventh aspect, alone or in combination with one or more of the first through sixth aspects, transmitting the digitally signed acknowledgement to the first network entity comprises transmitting the digitally signed acknowledgement to the first network entity based at least in part on a verification of the one or more parameters included in the message.

In an eighth aspect, alone or in combination with one or more of the first through seventh aspects, process 800 includes receiving an incentive based at least in part on transmitting the digitally signed acknowledgement to the first network entity.

In a ninth aspect, alone or in combination with one or more of the first through eighth aspects, transmitting the digitally signed acknowledgement to the first network entity comprises transmitting, to the first network entity, a communication that includes the digitally signed acknowledgement and one or more other digitally signed acknowledgements associated with relaying other data.

In a tenth aspect, alone or in combination with one or more of the first through ninth aspects, the first network entity is a network node.

In an eleventh aspect, alone or in combination with one or more of the first through tenth aspects, the second network entity is a remote mobile station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
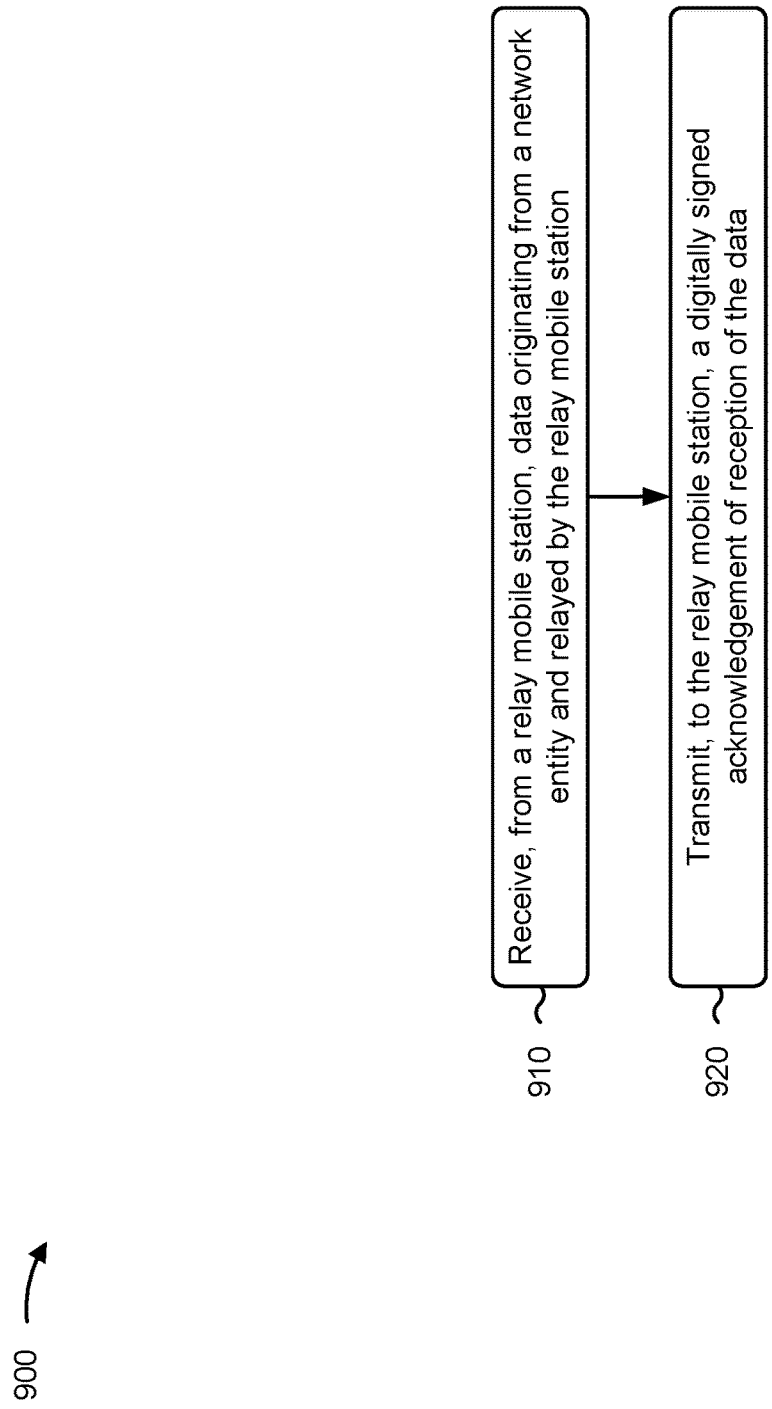
FIG. 9 is a diagram illustrating an example process performed, for example, by a mobile station, in accordance with the present disclosure.

FIG. 9 is a diagram illustrating an example process 900 performed, for example, by a mobile station, in accordance with the present disclosure. Example process 900 is an example where the mobile station (e.g., remote UE 120-2) performs operations associated with mobile station relaying verification.

As shown in FIG. 9, in some aspects, process 900 may include receiving, from a relay mobile station, data originating from a network entity and relayed by the relay mobile station (block 910). For example, the mobile station (e.g., using communication manager 1208 and/or reception component 1202, depicted in FIG. 12) may receive, from a relay mobile station, data originating from a network entity and relayed by the relay mobile station, as described above.

As further shown in FIG. 9, in some aspects, process 900 may include transmitting, to the relay mobile station, a digitally signed acknowledgement of reception of the data (block 920). For example, the mobile station (e.g., using communication manager 1208 and/or transmission component 1204, depicted in FIG. 12) may transmit, to the relay mobile station, a digitally signed acknowledgement of reception of the data, as described above.

Process 900 may include additional aspects, such as any single aspect or any combination of aspects described below and/or in connection with one or more other processes described elsewhere herein.

In a first aspect, the data comprises information that identifies the mobile station.

In a second aspect, alone or in combination with the first aspect, the data comprises broadcast data transmitted by the network entity, and process 900 includes transmitting, to the relay mobile station, a request for the broadcast data, wherein receiving the data comprises receiving the data from the relay mobile station based at least in part on transmitting the request for the broadcast data.

In a third aspect, alone or in combination with one or more of the first and second aspects, the digitally signed acknowledgement comprises a message comprising indications of one or more parameters associated with transmission of the data from the relay mobile station to the mobile station, and a digital signature associated with the mobile station.

In a fourth aspect, alone or in combination with one or more of the first through third aspects, the one or more parameters comprise at least one of a size of the data, a priority associated with the data, a QoS parameter associated with the data, a number of radio resources used for the transmission of the data from the relay mobile station to the mobile station, or a number of transmission attempts used for the transmission of the data from the relay mobile station to the mobile station.

In a fifth aspect, alone or in combination with one or more of the first through fourth aspects, the digital signature comprises a message digest, associated with the message, that is encrypted based at least in part on a private security key associated with the mobile station.

In a sixth aspect, alone or in combination with one or more of the first through fifth aspects, process 900 includes applying a hash function to the message, resulting in the message digest, encrypting the message digest based at least in part on a private security key associated with the mobile station, resulting in the digital signature, and attaching the digital signature to the message, resulting in the digitally signed acknowledgement.

In a seventh aspect, alone or in combination with one or more of the first through sixth aspects, process 900 includes transmitting, by the mobile station and to the network entity, a public security key associated with the mobile station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
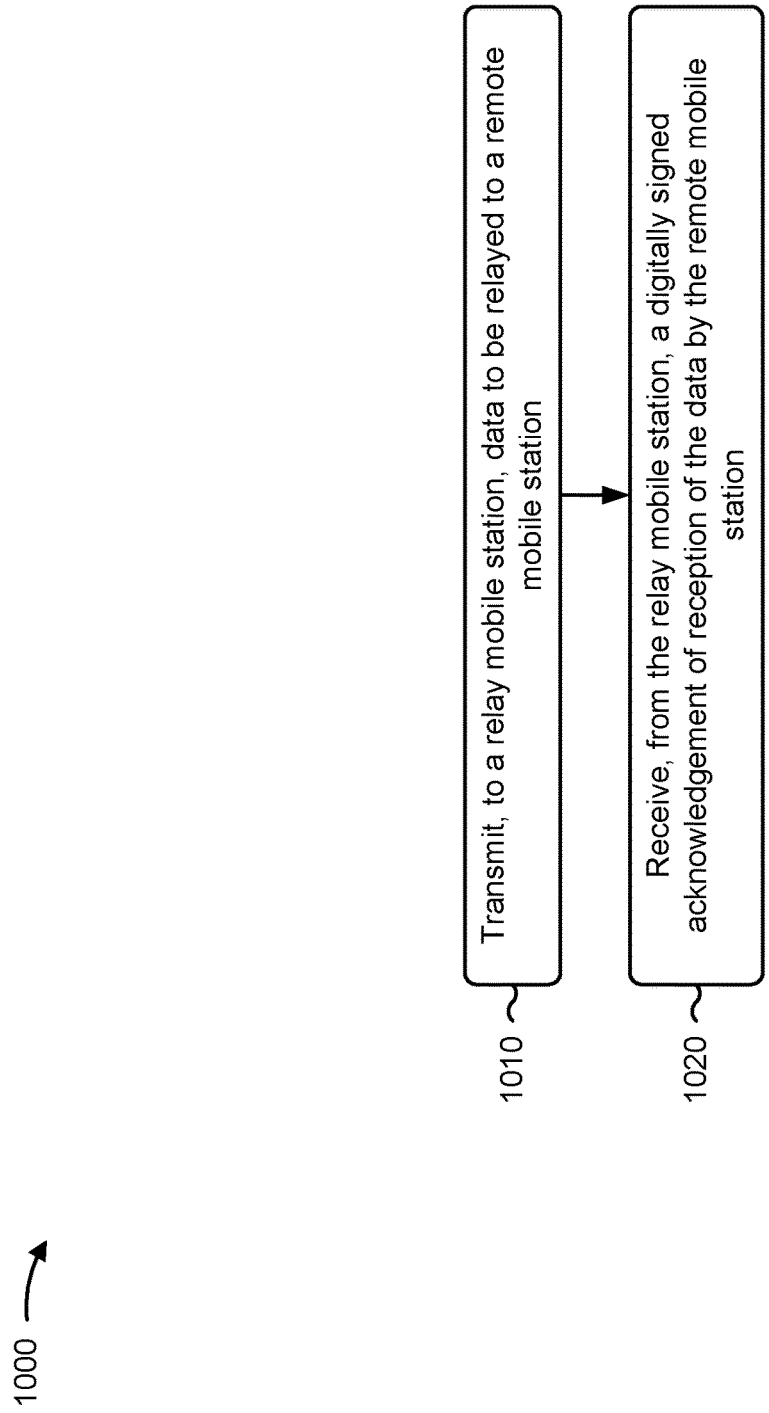
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., network node 110) performs operations associated with mobile station relaying verification.

As shown in FIG. 10, in some aspects, process 1000 may include transmitting, to a relay mobile station, data to be relayed to a remote mobile station (block 1010). For example, the network entity (e.g., using communication manager 1308 and/or transmission component 1304, depicted in FIG. 13) may transmit, to a relay mobile station, data to be relayed to a remote mobile station, as described above.

As further shown in FIG. 10, in some aspects, process 1000 may include receiving, from the relay mobile station, a digitally signed acknowledgement of reception of the data by the remote mobile station (block 1020). For example, the network entity (e.g., using communication manager 1308 and/or reception component 1302, depicted in FIG. 13) may receive, from the relay mobile station, a digitally signed acknowledgement of reception of the data by the remote mobile station, as described above.

Process 1000 may include additional aspects, such as any single aspect or any combination of aspects described below and/or in connection with one or more other processes described elsewhere herein.

In a first aspect, process 1000 includes transmitting, by the network entity and to the relay mobile station, an incentive or an indication of an incentive based at least in part on receiving the digitally signed acknowledgement.

In a second aspect, alone or in combination with the first aspect, the data comprises information that identifies the remote mobile station.

In a third aspect, alone or in combination with one or more of the first and second aspects, the data comprises broadcast data.

In a fourth aspect, alone or in combination with one or more of the first through third aspects, the digitally signed acknowledgement comprises a message comprising indications of one or more parameters associated with transmission of the data from the relay mobile station to the remote mobile station, and a digital signature associated with the remote mobile station.

In a fifth aspect, alone or in combination with one or more of the first through fourth aspects, the one or more parameters comprise at least one of a size of the data, a priority associated with the data, a QoS parameter associated with the data, a number of radio resources used for the transmission of the data from the relay mobile station to the remote mobile station, or a number of transmission attempts used for the transmission of the data from the relay mobile station to the remote mobile station.

In a sixth aspect, alone or in combination with one or more of the first through fifth aspects, the digital signature comprises a message digest, associated with the message, that is encrypted based at least in part on a private security key associated with the second network entity.

In a seventh aspect, alone or in combination with one or more of the first through sixth aspects, the message digest is a result of applying a hash function to the message.

In an eighth aspect, alone or in combination with one or more of the first through seventh aspects, process 1000 includes decrypting the message digest based at least in part on a public security key associated with the relay mobile station, and verifying the one or more parameters in the message based at least in part on the message digest.

In a ninth aspect, alone or in combination with one or more of the first through eighth aspects, process 1000 includes transmitting, by the network entity and to the relay mobile station, an incentive or an indication of an incentive based at least in part on verifying the one or more parameters in the message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
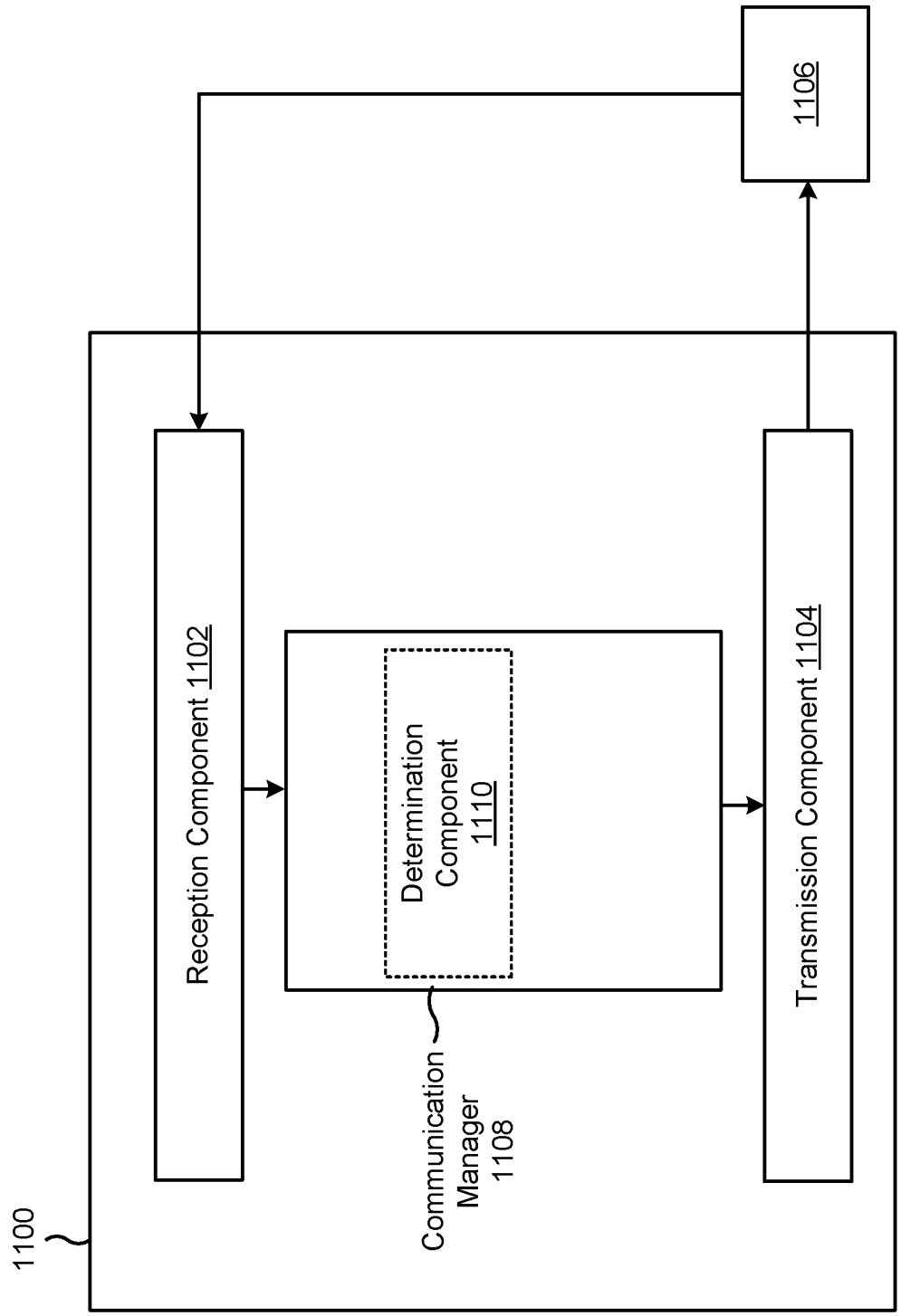
FIGS. 11-13 are diagrams of example apparatuses for wireless communication, in accordance with the present disclosure.

FIG. 11 is a diagram of an example apparatus 1100 for wireless communication, in accordance with the present disclosure. The apparatus 1100 may be a mobile station, or a mobile station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may perform operations similar to communication manager 140 described elsewhere herein. The communication manager 1108 may include a determination component 1110, among other examples.

In some aspects, the apparatus 1100 may be configured to perform one or more operations described herein in connection with FIGS. 6A-6B and 7. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the mobile station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the mobile station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the mobile station described in connection with FIG. 2. In some aspects, the transmission component 1104 may be co-located with the reception component 1102 in a transceiver.

The reception component 1102 may receive, from a first network entity, data to be relayed to a second network entity. The transmission component 1104 may transmit the data to the second network entity. The reception component 1102 may receive, from the second network entity, a digitally signed acknowledgement of reception of the data. The transmission component 1104 may transmit the digitally signed acknowledgement to the first network entity.

The determination component 1110 may determine that the data received from the first network entity is to be relayed to the second network entity.

The reception component 1102 may receive an incentive based at least in part on transmitting the digitally signed acknowledgement to the first network entity.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
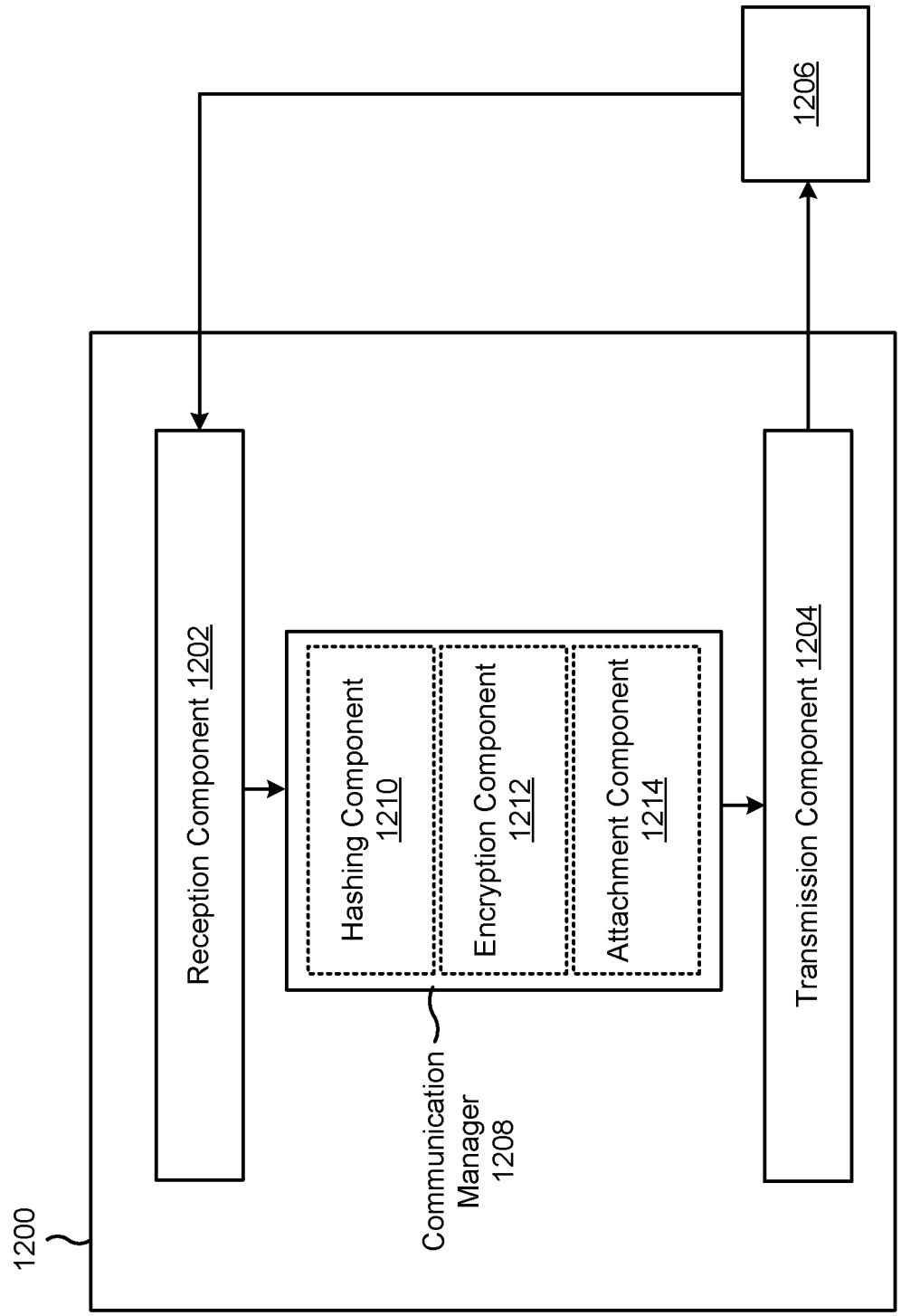

FIG. 12 is a diagram of an example apparatus 1200 for wireless communication, in accordance with the present disclosure. The apparatus 1200 may be a mobile station, or a mobile station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may perform operations similar to the communication manager 140 described elsewhere herein. The communication manager 1208 may include one or more of a hashing component 1210, an encryption component 1212, and/or an attachment component 1214, among other examples.

In some aspects, the apparatus 1200 may be configured to perform one or more operations described herein in connection with FIGS. 6A-6B and 7. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the mobile station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the mobile station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the mobile station described in connection with FIG. 2. In some aspects, the transmission component 1204 may be co-located with the reception component 1202 in a transceiver.

The reception component 1202 may receive, from a relay mobile station, data originating from a network entity and relayed by the relay mobile station. The transmission component 1204 may transmit, to the relay mobile station, a digitally signed acknowledgement of reception of the data.

The hashing component 1210 may apply a hash function to the message, resulting in the message digest.

The encryption component 1212 may encrypt the message digest based at least in part on a private security key associated with the mobile station, resulting in the digital signature.

The attachment component 1214 may attach the digital signature to the message, resulting in the digitally signed acknowledgement.

The transmission component 1204 may transmit, to the network entity, a public security key associated with the mobile station.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
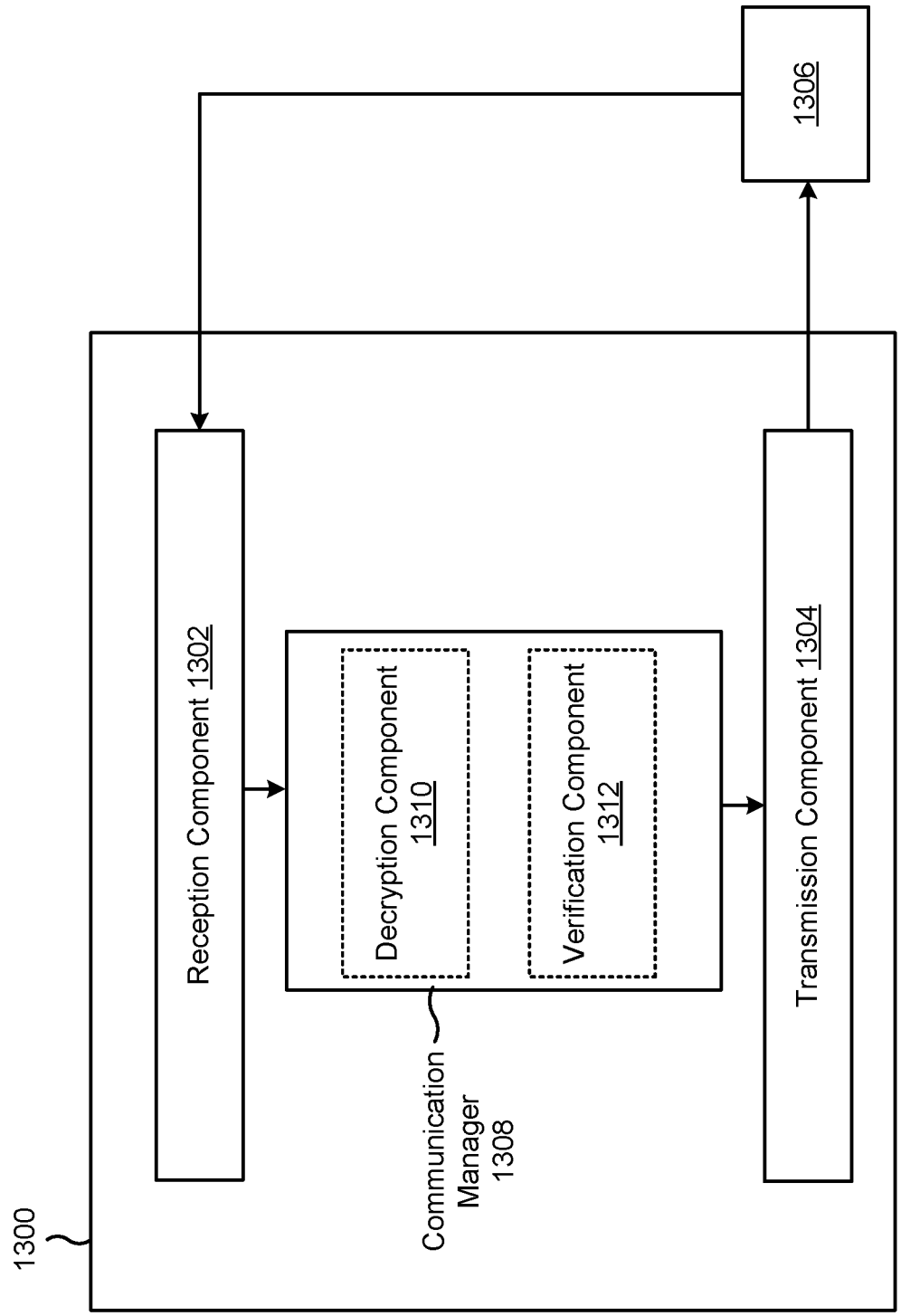

FIG. 13 is a diagram of an example apparatus 1300 for wireless communication, in accordance with the present disclosure. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may perform operations similar to the communication manager 150 described elsewhere herein. The communication manager 1308 may include one or more of a decryption component 1310 and/or a verification component 1312, among other examples.

In some aspects, the apparatus 1300 may be configured to perform one or more operations described herein in connection with FIGS. 6A-6B and 7. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 may transmit, to a relay mobile station, data to be relayed to a remote mobile station. The reception component 1302 may receive, from the relay mobile station, a digitally signed acknowledgement of reception of the data by the remote mobile station.

The transmission component 1304 may transmit, to the relay mobile station, an incentive or an indication of an incentive based at least in part on receiving the digitally signed acknowledgement.

The decryption component 1310 may decrypt the message digest based at least in part on a public security key associated with the relay mobile station.

The verification component 1312 may verify the one or more parameters in the message based at least in part on the message digest.

The transmission component 1304 may transmit, to the relay mobile station, an incentive or an indication of an incentive based at least in part on verifying the one or more parameters in the message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a mobile station, comprising: receiving, by the mobile station and from a first network entity, data to be relayed to a second network entity; transmitting, by the mobile station, the data to the second network entity; receiving, by the mobile station and from the second network entity, a digitally signed acknowledgement of reception of the data; and transmitting, by the mobile station, the digitally signed acknowledgement to the first network entity.

Aspect 2: The method of Aspect 1, wherein the data comprises information that identifies the second network entity, and wherein transmitting the data to the second network entity comprises: transmitting the data to the second network entity based at least in part on the information that identifies the second network entity.

Aspect 3: The method of Aspect 1, wherein the data comprises broadcast data transmitted by the first network entity, and further comprising: receiving, by the mobile station and from the second network entity, a request for the broadcast data, wherein transmitting the data to the second network entity comprises transmitting the data to the second network entity based at least in part on receiving the request for the broadcast data.

Aspect 4: The method of any of Aspects 1-3, wherein the digitally signed acknowledgement comprises: a message comprising indications of one or more parameters associated with transmission of the data from the mobile station to the second network entity; and a digital signature associated with the second network entity.

Aspect 5: The method of Aspect 4, wherein the one or more parameters comprise at least one of a size of the data, a priority associated with the data, a quality of service (QoS) parameter associated with the data, a number of radio resources used for the transmission of the data from the mobile station to the second network entity, or a number of transmission attempts used for the transmission of the data from the mobile station to the second network entity.

Aspect 6: The method of any of Aspects 4-5, wherein the digital signature comprises a message digest, associated with the message, that is encrypted based at least in part on a private security key associated with the second network entity.

Aspect 7: The method of Aspect 6, wherein the message digest is a result of applying a hash function to the message.

Aspect 8: The method of any of Aspects 4-7, wherein transmitting the digitally signed acknowledgement to the first network entity comprises: transmitting the digitally signed acknowledgement to the first network entity based at least in part on a verification of the one or more parameters included in the message.

Aspect 9: The method of any of Aspects 1-8, further comprising: receiving, by the mobile station, an incentive based at least in part on transmitting the digitally signed acknowledgement to the first network entity.

Aspect 10: The method of any of Aspects 1-9, wherein transmitting the digitally signed acknowledgement to the first network entity comprises: transmitting, to the first network entity, a communication that includes the digitally signed acknowledgement and one or more other digitally signed acknowledgements associated with relaying other data.

Aspect 11: The method of any of Aspects 1-10, wherein the first network entity is a network node.

Aspect 12: The method of any of Aspects 1-11, wherein the second network entity is a remote mobile station.

Aspect 13: A method of wireless communication performed by a mobile station, comprising: receiving, by the mobile station and from a relay mobile station, data originating from a network entity and relayed by the relay mobile station; and transmitting, by the mobile station and to the relay mobile station, a digitally signed acknowledgement of reception of the data.

Aspect 14: The method of Aspect 13, wherein the data comprises information that identifies the mobile station.

Aspect 15: The method of Aspect 13, wherein the data comprises broadcast data transmitted by the network entity, and further comprising: transmitting, by the mobile station and to the relay mobile station, a request for the broadcast data, wherein receiving the data comprises receiving the data from the relay mobile station based at least in part on transmitting the request for the broadcast data.

Aspect 16: The method of any of Aspects 13-15, wherein the digitally signed acknowledgement comprises: a message comprising indications of one or more parameters associated with transmission of the data from the relay mobile station to the mobile station; and a digital signature associated with the mobile station.

Aspect 17: The method of Aspect 16, wherein the one or more parameters comprise at least one of a size of the data, a priority associated with the data, a quality of service (QoS) parameter associated with the data, a number of radio resources used for the transmission of the data from the relay mobile station to the mobile station, or a number of transmission attempts used for the transmission of the data from the relay mobile station to the mobile station.

Aspect 18: The method of any of Aspects 16-17, wherein the digital signature comprises a message digest, associated with the message, that is encrypted based at least in part on a private security key associated with the mobile station.

Aspect 19: The method of Aspect 18, further comprising: applying a hash function to the message, resulting in the message digest; encrypting the message digest based at least in part on a private security key associated with the mobile station, resulting in the digital signature; and attaching the digital signature to the message, resulting in the digitally signed acknowledgement.

Aspect 20: The method of any of Aspects 18-19, further comprising: transmitting, by the mobile station and to the network entity, a public security key associated with the mobile station.

Aspect 21: A method of wireless communication performed by a network entity, comprising: transmitting, by the network entity and to a relay mobile station, data to be relayed to a remote mobile station; and receiving, by the network entity and from the relay mobile station, a digitally signed acknowledgement of reception of the data by the remote mobile station.

Aspect 22: The method of Aspect 21, further comprising: transmitting, by the network entity and to the relay mobile station, an incentive or an indication of an incentive based at least in part on receiving the digitally signed acknowledgement.

Aspect 23: The method of any of Aspects 21-22, wherein the data comprises information that identifies the remote mobile station.

Aspect 24: The method of any of Aspects 21-22, wherein the data comprises broadcast data.

Aspect 25: The method of any of Aspects 21-24, wherein the digitally signed acknowledgement comprises: a message comprising indications of one or more parameters associated with transmission of the data from the relay mobile station to the remote mobile station; and a digital signature associated with the remote mobile station.

Aspect 26: The method of Aspect 25, wherein the one or more parameters comprise at least one of a size of the data, a priority associated with the data, a quality of service (QoS) parameter associated with the data, a number of radio resources used for the transmission of the data from the relay mobile station to the remote mobile station, or a number of transmission attempts used for the transmission of the data from the relay mobile station to the remote mobile station.

Aspect 27: The method of any of Aspects 25-26, wherein the digital signature comprises a message digest, associated with the message, that is encrypted based at least in part on a private security key associated with the second network entity.

Aspect 28: The method of Aspect 27, wherein the message digest is a result of applying a hash function to the message.

Aspect 29: The method of any of Aspects 27-28, further comprising: decrypting the message digest based at least in part on a public security key associated with the relay mobile station; and verifying the one or more parameters in the message based at least in part on the message digest.

Aspect 30: The method of Aspect 29, further comprising: transmitting, by the network entity and to the relay mobile station, an incentive or an indication of an incentive based at least in part on verifying the one or more parameters in the message.

Aspect 31: An apparatus for wireless communication at a device, comprising a processor; memory coupled with the processor; and instructions stored in the memory and executable by the processor to cause the apparatus to perform the method of one or more of Aspects 1-12.

Aspect 32: A device for wireless communication, comprising a memory and one or more processors coupled to the memory, the one or more processors configured to perform the method of one or more of Aspects 1-12.

Aspect 33: An apparatus for wireless communication, comprising at least one means for performing the method of one or more of Aspects 1-12.

Aspect 34: A non-transitory computer-readable medium storing code for wireless communication, the code comprising instructions executable by a processor to perform the method of one or more of Aspects 1-12.

Aspect 35: A non-transitory computer-readable medium storing a set of instructions for wireless communication, the set of instructions comprising one or more instructions that, when executed by one or more processors of a device, cause the device to perform the method of one or more of Aspects 1-12.

Aspect 36: An apparatus for wireless communication at a device, comprising a processor; memory coupled with the processor; and instructions stored in the memory and executable by the processor to cause the apparatus to perform the method of one or more of Aspects 13-20.

Aspect 37: A device for wireless communication, comprising a memory and one or more processors coupled to the memory, the one or more processors configured to perform the method of one or more of Aspects 13-20.

Aspect 38: An apparatus for wireless communication, comprising at least one means for performing the method of one or more of Aspects 13-20.

Aspect 39: A non-transitory computer-readable medium storing code for wireless communication, the code comprising instructions executable by a processor to perform the method of one or more of Aspects 13-20.

Aspect 40: A non-transitory computer-readable medium storing a set of instructions for wireless communication, the set of instructions comprising one or more instructions that, when executed by one or more processors of a device, cause the device to perform the method of one or more of Aspects 13-20.

Aspect 41: An apparatus for wireless communication at a device, comprising a processor; memory coupled with the processor; and instructions stored in the memory and executable by the processor to cause the apparatus to perform the method of one or more of Aspects 21-30.

Aspect 42: A device for wireless communication, comprising a memory and one or more processors coupled to the memory, the one or more processors configured to perform the method of one or more of Aspects 21-30.

Aspect 43: An apparatus for wireless communication, comprising at least one means for performing the method of one or more of Aspects 21-30.

Aspect 44: A non-transitory computer-readable medium storing code for wireless communication, the code comprising instructions executable by a processor to perform the method of one or more of Aspects 21-30.

Aspect 45: A non-transitory computer-readable medium storing a set of instructions for wireless communication, the set of instructions comprising one or more instructions that, when executed by one or more processors of a device, cause the device to perform the method of one or more of Aspects 21-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories; and
one or more processors, configured to, based at least in part on information stored in the one or more memories:
receive, from a first network entity, data to be relayed to a second network entity;
transmit the data to the second network entity;
receive, from the second network entity, a digitally signed acknowledgement of reception of the data,
wherein the digitally signed acknowledgement includes:
a message that includes a plurality of parameters associated with the data, and
a digital signature that is based at least in part on hashing the message and encrypting the hashed message using a private security key of the second network entity; and
transmit the digitally signed acknowledgement to the first network entity.

2. The apparatus of claim 1, wherein the data comprises information that identifies the second network entity, and wherein the one or more processors, to transmit the data to the second network entity, are configured to, based at least in part on information stored in the one or more memories:
transmit the data to the second network entity based at least in part on the information that identifies the second network entity.

3. The apparatus of claim 1, wherein the data comprises broadcast data transmitted by the first network entity, and the one or more processors are further configured to, based at least in part on information stored in the one or more memories:
receive, from the second network entity, a request for the broadcast data, wherein the one or more processors, to transmit, the data to the second network entity, are configured to transmit the data to the second network entity based at least in part on receiving the request for the broadcast data.

4. The apparatus of claim 1, wherein the plurality of parameters comprise at least one of a size of the data, a priority associated with the data, a quality of service (QOS) parameter associated with the data, a number of radio resources used for transmission of the data from the apparatus to the second network entity, or a number of transmission attempts used for transmission of the data from the apparatus to the second network entity.

5. The apparatus of claim 1, wherein the hashing the message results in a message digest, associated with the message, that is encrypted based at least in part on the private security key.

6. The apparatus of claim 1, wherein hashing the message comprises applying a secure hash algorithm 1 (SHA-1) to the message.

7. The apparatus of claim 1, wherein the one or more processors, to transmit the digitally signed acknowledgement to the first network entity, are configured to, based at least in part on information stored in the one or more memories:
transmit the digitally signed acknowledgement to the first network entity based at least in part on a verification of the plurality of parameters included in the message.

8. The apparatus of claim 1, wherein the one or more processors are further configured to, based at least in part on information stored in the one or more memories:
receive an incentive based at least in part on transmitting the digitally signed acknowledgement to the first network entity,
wherein the incentive is determined by a network charging function (CHF) based at least in part on correlating reports, from the apparatus and the second network entity, of relaying the data to the second network entity.

9. The apparatus of claim 8, wherein the incentive is a monetary incentive, a quality of service (QOS) incentive, or digital tokens.

10. The apparatus of claim 1, wherein the one or more processors, to transmit the digitally signed acknowledgement to the first network entity, are configured to, based at least in part on information stored in the one or more memories:
transmit, to the first network entity, a communication that includes the digitally signed acknowledgement and one or more other digitally signed acknowledgements associated with relaying other data.

11. The apparatus of claim 1, wherein the first network entity is a network node.

12. The apparatus of claim 1, wherein the second network entity is a remote mobile station.

13. An apparatus for wireless communication, comprising:
one or more memories; and
one or more processors, configured to, based at least in part on information stored in the one or more memories:
receive, from a relay mobile station, data originating from a network entity and relayed by the relay mobile station; and
transmit, to the relay mobile station, a digitally signed acknowledgement of reception of the data,
wherein the digitally signed acknowledgement includes:
a message that includes a plurality of parameters associated with the data, and
a digital signature that is based at least in part on hashing the message and encrypting the hashed message using a private security key of the apparatus.

14. The apparatus of claim 13, wherein the data comprises information that identifies the apparatus.

15. The apparatus of claim 13, wherein the data comprises broadcast data transmitted by the network entity, and the one or more processors are further configured to, based at least in part on information stored in the one or more memories:
transmit, to the relay mobile station, a request for the broadcast data, wherein receiving the data comprises receiving the data from the relay mobile station based at least in part on transmitting the request for the broadcast data.

16. The apparatus of claim 13, wherein the plurality of parameters comprise at least one of a size of the data, a priority associated with the data, a quality of service (QOS) parameter associated with the data, a number of radio resources used for transmission of the data from the relay mobile station to the apparatus, or a number of transmission attempts used for transmission of the data from the relay mobile station to the apparatus.

17. The apparatus of claim 13, wherein hashing the message results in a message digest, associated with the message, that is encrypted based at least in part on the private security key.

18. The apparatus of claim 17, wherein the one or more processors are further configured to, based at least in part on information stored in the one or more memories:
transmit, to the network entity, a public security key associated with the apparatus.

19. The apparatus of claim 13, wherein hashing the message comprises applying a hash secure algorithm 1 (SHA-1) to the message.

20. The apparatus of claim 13, wherein the data comprises broadcast data transmitted by the network entity.

21. A method of wireless communication performed by a mobile station, comprising:
receiving, by the mobile station and from a first network entity, data to be relayed to a second network entity;
transmitting, by the mobile station, the data to the second network entity;
receiving, by the mobile station and from the second network entity, a digitally signed acknowledgement of reception of the data,
wherein the digitally signed acknowledgement includes:
a message that includes a plurality of parameters associated with the data, and
a digital signature that is based at least in part on hashing the message and encrypting the hashed message using a private security key of the second network entity; and
transmitting, by the mobile station, the digitally signed acknowledgement to the first network entity.

22. The method of claim 21, wherein the plurality of parameters comprise at least one of a size of the data, a priority associated with the data, a quality of service (QOS) parameter associated with the data, a number of radio resources used for transmission of the data from the mobile station to the second network entity, or a number of transmission attempts used for transmission of the data from the mobile station to the second network entity.

23. The method of claim 21, wherein hashing the message results in a message digest, associated with the message, that is encrypted based at least in part on the private security key.

24. The method of claim 21, wherein transmitting the digitally signed acknowledgement to the first network entity comprises:
transmitting the digitally signed acknowledgement to the first network entity based at least in part on a verification of the plurality of parameters included in the message.

25. The method of claim 21, wherein transmitting the digitally signed acknowledgement to the first network entity comprises:
transmitting, to the first network entity, a communication that includes the digitally signed acknowledgement and one or more other digitally signed acknowledgements associated with relaying other data.

26. A method of wireless communication performed by a mobile station, comprising:
receiving, by the mobile station and from a relay mobile station, data originating from a network entity and relayed by the relay mobile station; and
transmitting, by the mobile station and to the relay mobile station, a digitally signed acknowledgement of reception of the data,
wherein the digitally signed acknowledgement includes:

a message that includes a plurality of parameters associated with the data, and a digital signature that is based at least in part on hashing the message and encrypting the hashed message using a private security key of the mobile station.

27. The method of claim 26, wherein the plurality of parameters comprise at least one of a size of the data, a priority associated with the data, a quality of service (QOS) parameter associated with the data, a number of radio resources used for transmission of the data from the relay mobile station to the mobile station, or a number of transmission attempts used for transmission of the data from the relay mobile station to the mobile station.

28. The method of claim 26, wherein hashing the message results in a message digest, associated with the message, that is encrypted based at least in part on the private security key.

29. The method of claim 28, wherein hashing the message comprises applying a secure hash algorithm 1 (SHA-1) to the message.

30. The method of claim 26, wherein the data comprises broadcast data transmitted by the network entity.

* * * * *